US011722937B2

United States Patent
Quan et al.

(10) Patent No.: US 11,722,937 B2
(45) Date of Patent: Aug. 8, 2023

(54) SIGNALING OPTIMIZATION METHOD AND DEVICE

(71) Applicant: Huawei Technologies Co., Ltd., Shenzhen (CN)

(72) Inventors: Wei Quan, Beijing (CN); Bingzhao Li, Beijing (CN); Zhenxing Hu, Shenzhen (CN); Jinhua Miao, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 254 days.

(21) Appl. No.: 15/669,430

(22) Filed: Aug. 4, 2017

(65) Prior Publication Data

US 2017/0339612 A1  Nov. 23, 2017

Related U.S. Application Data

(63) Continuation of application No. PCT/CN2015/072452, filed on Feb. 6, 2015.

(51) Int. Cl.
*H04W 36/04* (2009.01)
*H04W 36/26* (2009.01)
(Continued)

(52) U.S. Cl.
CPC ..... *H04W 36/04* (2013.01); *H04W 36/00835* (2018.08); *H04W 36/00837* (2018.08);
(Continued)

(58) Field of Classification Search
CPC . H04W 36/04; H04W 36/0083; H04W 36/26; H04W 76/27; H04W 76/046; H04W 88/02; H04W 88/08; H04W 68/02
(Continued)

(56) References Cited

U.S. PATENT DOCUMENTS

2006/0194582 A1\* 8/2006 Cooper ............ H04W 36/0061
455/436
2008/0188215 A1\* 8/2008 Bergstrom ............ H04W 48/20
455/424
(Continued)

FOREIGN PATENT DOCUMENTS

CN  101536585 A  9/2009
CN  101584134 A  11/2009
(Continued)

OTHER PUBLICATIONS

"Power Saving State for MTC and other mobile data applications," 3GPP TSG RAN WG2 #83, Barcelona, Spain, R2-132644, pp. 1-3, 3rd Generation Partnership Project, Valbonne, France (Aug. 19-23, 2013).

(Continued)

*Primary Examiner* — Huy C Ho
(74) *Attorney, Agent, or Firm* — Leydig, Voit & Mayer, Ltd.

(57) ABSTRACT

Disclosed are a signaling optimization method and device, to resolve a problem of heavy signaling overheads and long data transmission delay when a user equipment (UE) accesses a network side. The method includes: receiving, by the UE, configuration information sent by a first network side device, where the configuration information includes a list, and the list is a cell list or a base station list; and entering, by the UE, an intermediate state according to the configuration information, where the intermediate state means that: when the UE stores context information of the UE, if the UE moves and a cell movement range falls within a coverage area of a cell or a base station included in the list, the UE performs cell reselection according to the list. Embodiments of the present disclosure are applicable to
(Continued)

optimization of signaling transmission between the UE and a network side.

20 Claims, 10 Drawing Sheets

(51) Int. Cl.
 *H04W 36/00* (2009.01)
 *H04W 76/27* (2018.01)
 *H04W 68/02* (2009.01)
 *H04W 88/02* (2009.01)
 *H04W 88/08* (2009.01)

(52) U.S. Cl.
 CPC ........... *H04W 36/26* (2013.01); *H04W 68/02* (2013.01); *H04W 76/27* (2018.02); *H04W 36/0061* (2013.01); *H04W 36/0085* (2018.08); *H04W 88/02* (2013.01); *H04W 88/08* (2013.01)

(58) Field of Classification Search
 USPC ........................................................ 455/435.2
 See application file for complete search history.

(56) References Cited

U.S. PATENT DOCUMENTS

| | | | |
|---|---|---|---|
| 2009/0082072 | A1 | 3/2009 | Ulupinar et al. |
| 2012/0003977 | A1 | 1/2012 | Iwamura et al. |
| 2012/0028639 | A1 | 2/2012 | Jeong et al. |
| 2012/0281566 | A1 | 11/2012 | Pelletier et al. |
| 2013/0028097 | A1 | 1/2013 | Barrett |
| 2013/0039339 | A1 | 2/2013 | Rayavarapu et al. |
| 2013/0142104 | A1 | 6/2013 | Lee et al. |
| 2013/0208699 | A1* | 8/2013 | Hakkinen ............. H04W 76/38 370/331 |
| 2013/0229931 | A1 | 9/2013 | Kim |
| 2013/0244664 | A1 | 9/2013 | Song et al. |
| 2013/0260810 | A1 | 10/2013 | Rayavarapu |
| 2014/0038610 | A1 | 2/2014 | Kyeong-In et al. |
| 2014/0079038 | A1 | 3/2014 | Maeda et al. |
| 2014/0220984 | A1 | 8/2014 | Mandapaka et al. |
| 2014/0334366 | A1 | 11/2014 | Hsu et al. |
| 2015/0173017 | A1 | 6/2015 | Rakotoharison et al. |
| 2016/0135247 | A1* | 5/2016 | Ozturk ............. H04W 52/0212 455/436 |

FOREIGN PATENT DOCUMENTS

| | | |
|---|---|---|
| CN | 101686526 A | 3/2010 |
| CN | 101854618 A | 10/2010 |
| CN | 103460788 A | 12/2013 |
| CN | 104144452 A | 11/2014 |
| CN | 104756554 A | 7/2015 |
| EP | 1802158 A2 | 6/2007 |
| EP | 2892281 A1 | 7/2015 |
| JP | 2010199632 A | 9/2010 |
| JP | 2013013162 A | 1/2013 |
| JP | 2013534793 A | 9/2013 |
| JP | 2014522164 A | 8/2014 |
| JP | 2015524626 A | 8/2015 |
| KR | 20100068464 A | 6/2010 |
| KR | 20120113673 A | 10/2012 |
| KR | 20140050672 A | 4/2014 |
| KR | 20140103545 A | 8/2014 |
| KR | 20140136043 A | 11/2014 |
| RU | 2455793 C2 | 7/2012 |
| WO | 2011039959 A1 | 4/2011 |
| WO | 2014023230 A1 | 2/2014 |
| WO | 2014024411 A1 | 2/2014 |
| WO | 2014034089 A1 | 3/2014 |
| WO | 2014161604 A1 | 10/2014 |
| WO | 2014180353 A1 | 11/2014 |
| WO | 2014180355 A1 | 11/2014 |
| WO | 2015085273 A1 | 6/2015 |
| WO | 2016105570 A1 | 6/2016 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304 V12.3.0, pp. 1-37, 3rd Generation Partnership Project, Valbonne, France (Dec. 2014).

Fan et al., "UE Power Saving with RRC Semi-Connected State in LTE," 2014 Wireless Telecommunications Symposium, pp. 1-5, Institute of Electrical and Electronics Engineers, New York, New York (Apr. 2014).

CN/201580071197, Office Action, dated Mar. 4, 2020.

CN/201910664251, Office Action, dated Mar. 18, 2020.

* cited by examiner

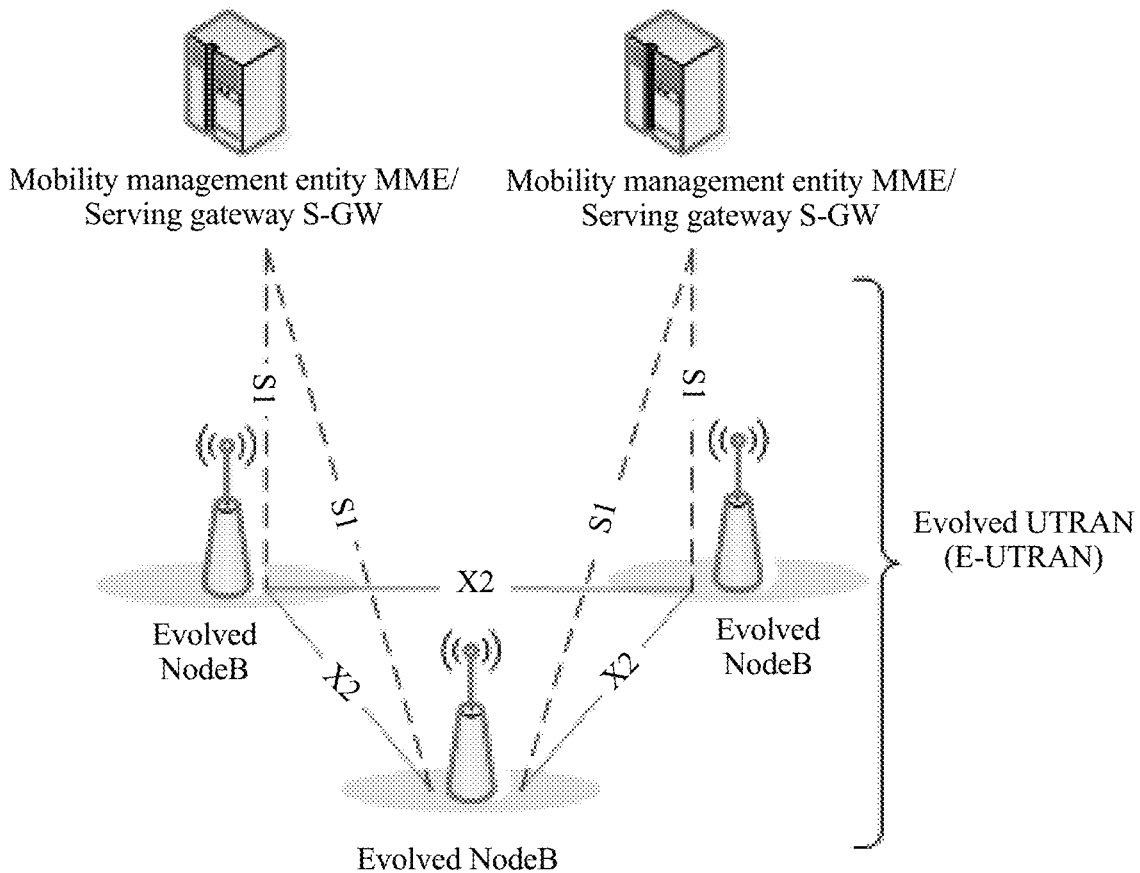

FIG. 1

User equipment UE receives configuration information sent by a first network side device, where the configuration information includes a list, and the list is a cell list or a base station list — 201

The UE enters an intermediate state according to the configuration information, where the intermediate state means that when the UE stores context information of the UE, if the UE moves and a cell movement range falls within a coverage area of a cell or a base station included in the list, the UE performs cell reselection according to the list — 202

FIG. 2

A first network side device sends configuration information to UE, where the configuration information includes a list, the list is a cell list or a base station list, the configuration information is used to instruct The UE to enter an intermediate state, and the intermediate state means that: when the UE stores context information of the UE, if the UE moves and a cell movement range falls within a coverage area of a cell or a base station included in the list, the UE performs cell reselection according to the list ⎯ 301

The first network side device sends the context information to a network side device in the list ⎯ 302

FIG. 3

UE establishes an RRC connection to a first network side device, and enters an RRC connection state ⎯ 401

The first network side device sends configuration information to the UE, where the configuration information includes a list, and the list is a cell list or a base station list ⎯ 402

The UE enters an intermediate state according to the configuration information, where the intermediate state means that when the UE stores context information of the UE, if the UE moves and a cell movement range falls within the list, the UE performs cell reselection according to the list ⎯ 403

After the UE enters the intermediate state, if the UE moves and a cell movement range falls within the list, the UE performs cell reselection ⎯ 404

The first network side device sends the context information of the UE to a network side device in the list ⎯ 405

FIG. 4

SIGNALING OPTIMIZATION METHOD AND DEVICE

CROSS-REFERENCE TO RELATED APPLICATIONS

This application is a continuation of International Application No. PCT/CN2015/072452, filed on Feb. 6, 2015, the disclosure of which is hereby incorporated by reference in its entirety.

TECHNICAL FIELD

The present disclosure relates to the communications field, and in particular, to a signaling optimization method and a device.

BACKGROUND

Long Term Evolution (LTE) is evolution of a Universal Mobile Telecommunications System (UMTS) formulated by the 3rd Generation Partnership Project (3GPP) organization. There is a packet domain in an LTE system. As shown in FIG. 1, the packet domain includes two network elements: an evolved packet core (EPC) and an evolved NodeB (eNodeB). The EPC is responsible for a core network part. A mobility management entity (MME) is responsible for a signaling processing part, and a serving gateway (S-GW) is responsible for a data processing part. The eNodeB is responsible for a part of an access network that is also referred to as an evolved UTRAN (E-UTRAN).

In the foregoing network architecture, when a user equipment (UE) initiates a communications service to send user-plane data, the user equipment needs to first establish a radio resource control (RRC) connection to a network side. That is, the user equipment initiates a connection to an access network and initiates a connection to a core network. Therefore, the UE switches from an idle state to a connection state, and further establishes a data bearer to send data. When the UE is in the connection state, a cell handover may occur if the UE moves. When the UE does not perform data transmission, an RRC connection release process may be executed. Therefore, the UE returns to the idle state. When the UE needs to perform data transmission again, a process of establishing an RRC connection to the access network and an RRC connection to the core network, a process of establishing a data bearer, and the like are then performed. In this case, if the UE in the idle state needs to transmit data, the UE needs to first establish the RRC connection and the data bearer. Consequently, signaling overheads and a data transmission delay of the UE are increased. However, if the UE keeps in the connection state, the cell handover of the UE caused by movement of the UE increases the signaling overheads and power consumption of the UE.

SUMMARY

Embodiments of the present disclosure provide a signaling optimization method and a device, to resolve a prior-art problem of heavy signaling overheads and a long data transmission delay when UE accesses a network side.

According to a first aspect, a signaling optimization method is provided, including:

receiving, by a user equipment (UE), configuration information sent by a first network side device, where the configuration information includes a list, and the list is a cell list or a base station list; and entering, by the UE, an intermediate state according to the configuration information, where the intermediate state means that: when the UE stores context information of the UE, if the UE moves and a cell movement range falls within a coverage area of a cell or a base station included in the list, the UE performs cell reselection according to the list.

With reference to the first aspect, in a first possible implementation of the first aspect, the intermediate state further means that: if the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the first aspect or the first possible implementation of the first aspect, in a second possible implementation of the first aspect, the configuration information further includes a condition under which the first network side device instructs the UE to enter the intermediate state according to the configuration information, and the condition includes entering the intermediate state immediately or entering the idle state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the first aspect to the second possible implementation of the first aspect, in a third possible implementation of the first aspect, the configuration information further includes a cell reselection parameter for performing cell reselection by the UE.

With reference to the first aspect to the third possible implementation of the first aspect, in a fourth possible implementation of the first aspect, the configuration information is carried in a radio resource control (RRC) message by the first network side device, and the RRC message includes an RRC connection establishment message, an RRC reconfiguration message, or an RRC connection release message.

With reference to the first aspect to the fourth possible implementation of the first aspect, in a fifth possible implementation of the first aspect, in a process in which the UE performs cell reselection, when it is determined that the UE needs to send uplink data to a network side and/or needs to receive downlink data from the network side, the method further includes:

restoring the UE to the connection state; and sending, by the UE, the uplink data to a network side device that has been restored to the connection state, and/or receiving the downlink data from the network side device that has been restored to the connection state, where the network side device that has been restored to the connection state includes the first network side device or the second network side device.

With reference to the fifth possible implementation of the first aspect, in a sixth possible implementation of the first aspect, the restoring the UE to the connection state includes:

if the cell of the UE does not change, sending, by the UE, a scheduling request or a random access request to the first network side device, to restore the UE to the connection state.

With reference to the fifth possible implementation of the first aspect, in a seventh possible implementation of the first aspect, the restoring the UE to the connection state includes:

sending, by the UE, an RRC resume request message to the first network side device or the second network side device, where the RRC resume request message includes at least one of cell information of the first network side device, a cell radio network temporary identity (C-RNTI) of the UE, or indication information for requesting to restore the UE to the connection state;

receiving, by the UE, an RRC resume confirmation message sent by the first network side device or the second network side device, where the RRC resume confirmation message is used to indicate that the UE is restored to the connection state; and sending, by the UE, an RRC connection resume completion message to the first network side device or the second network side device.

According to a second aspect, a signaling optimization method is provided, including:

sending, by a first network side device, configuration information to a user equipment (UE), where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list; and sending, by the first network side device, the context information of the UE to a network side device in the list.

With reference to the second aspect, in a first possible implementation of the second aspect, the configuration information is further used to indicate that: after the UE enters the intermediate state, if the UE moves and the cell movement range falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the second aspect or the first possible implementation of the second aspect, in a second possible implementation of the second aspect, the configuration information further includes a condition under which the first network side device instructs the UE to enter the intermediate state according to the configuration information, and the condition includes entering the intermediate state immediately or entering the intermediate state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the second aspect to the second possible implementation of the second aspect, in a third possible implementation of the second aspect, the configuration information further includes a cell reselection parameter for performing cell reselection by the UE.

With reference to the second aspect to the third possible implementation of the second aspect, in a fourth possible implementation of the second aspect, the sending, by a first network side device, configuration information to the UE includes:

sending, by the first network side device, the configuration information to the UE by using a radio resource control (RRC) message, where the RRC message includes an RRC reconfiguration message or an RRC connection release message.

With reference to the second aspect to the fourth possible implementation of the second aspect, in a fifth possible implementation of the second aspect, the method further includes:

sending, by the first network side device, the context information of the UE to a core network device; and releasing the context information of the UE when the first network side device stores the context information of the UE for a preset time.

With reference to the second aspect to the fifth possible implementation of the second aspect, in a sixth possible implementation of the second aspect, the method further includes:

receiving, by the first network side device, an RRC resume request message sent by the UE, where the RRC resume request message includes at least one of cell information of the first network side device, a cell radio network temporary identity (C-RNTI) of the UE, or indication information for requesting to restore the UE to the connection state;

sending, by the first network side device, an RRC resume confirmation message to the UE, where the RRC resume confirmation message includes a parameter for extending, deleting, or modifying the context information of the UE by the first network side device; and receiving, by the first network side device, an RRC connection resume completion message sent by the UE.

With reference to the second aspect to the sixth possible implementation of the second aspect, in a seventh possible implementation of the second aspect, the method further includes:

receiving, by the first network side device, an uplink scheduling request or a random access request sent by the UE; and sending, by the first network side device, an uplink resource to the UE, where the uplink resource is used by the UE to send uplink data to the first network side device or to receive downlink data from the first network side device according to the uplink resource.

According to a third aspect, a signaling optimization method is provided, including:

receiving, by a second network side device, indication information of a user equipment (UE) in an intermediate state that is sent by a first network side device, where the intermediate state means that: when the UE stores context information of the UE, if the UE moves and a cell movement range falls within a coverage area of a cell or a base station included in a list sent by the first network side device, the UE performs cell reselection according to the list; and obtaining, by the second network side device, the context information of the UE from the first network side device, or obtaining the context information of the UE from the second network side device when the second network side device receives a radio resource control (RRC) resume request message sent by the UE, so as to receive uplink data from the UE or send downlink data to the UE.

With reference to the third aspect, in a first possible implementation of the third aspect, the method further includes:

receiving and saving, by the second network side device, context information of the UE that is sent by the first network side device.

With reference to the third aspect or the first possible implementation of the third aspect, in a second possible implementation of the third aspect, the obtaining, by the second network side device, context information of the UE from the first network side device, or obtaining the context information of the UE from the second network side device when the second network side device receives a radio resource control (RRC) resume request message sent by the UE includes:

if the second network side device does locally store the context information of the UE before the second network side device receives the RRC resume request message sent by the UE, obtaining, by the second network side device, the context information of the UE from the second network side device; or if the second network side device does not locally store the context information of the UE before the second network side device receives the RRC resume request message sent by the UE, obtaining, by the second network side device, the context information of the UE from the first network side device, where the RRC resume request message is used to be sent to the second network side device when the UE is restored from the intermediate state to a connection state.

With reference to the third aspect to the second possible implementation of the third aspect, in a third possible implementation of the third aspect, the method further includes:

when the second network side device receives a paging message sent by a core network device and determines that there is downlink data that needs to be sent to the UE, sending the paging message to the UE, and after the second network side device establishes an RRC connection to the UE, sending, to the UE, downlink data received from the core network device; or when the second network side device receives a paging message sent by the first network side device and determines that there is downlink data that needs to be sent to the UE, sending the paging message to the UE, and after the second network side device establishes an RRC connection to the UE, sending, to the UE, downlink data received from the first network side device.

According to a fourth aspect, a signaling optimization method is provided, including:

receiving, by a core network device, indication information of a user equipment (UE) in an intermediate state that is sent by the UE, where the intermediate state means that: when the UE stores context information of the UE, if the UE moves and a cell movement range falls within a coverage area of a cell or a base station included in a list sent by a first network side device to the UE, the UE performs cell reselection according to the list; and if the core network device needs to transmit downlink data to the UE, sending, by the core network device, a paging message to at least one network side device in the list, to send the downlink data to the UE by using a first network side device or a second network side device that is in the at least one network side device and that is connected to the UE; or sending, by the core network device, the downlink data to the first network side device, to send the downlink data to the UE by using the first network side device; or sending, by the core network device, the downlink data to at least one network side device in the list, to send the downlink data to the UE by using the at least one network side device.

With reference to the fourth aspect, in a first possible implementation of the fourth aspect, the method further includes:

receiving and saving, by the core network device, context information of the UE that is sent by the first network side device.

According to a fifth aspect, a user equipment (UE) is provided, including:

a receiving unit, configured to receive configuration information sent by a first network side device, where the configuration information includes a list, and the list is a cell list or a base station list; and a processing unit, configured to enter an intermediate state according to the configuration information, where the intermediate state means that: when the UE stores context information of the UE, if the UE moves and a cell movement range falls within a coverage area of a cell or a base station included in the list, the UE performs cell reselection according to the list.

With reference to the fifth aspect, in a first possible implementation of the fifth aspect, the intermediate state further means that: if the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the fifth aspect to the first possible implementation of the fifth aspect, in a second possible implementation of the fifth aspect, the configuration information further includes a condition under which the first network side device instructs the UE to enter the intermediate state according to the configuration information, and the condition includes entering the intermediate state immediately or entering the idle state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the fifth aspect to the second possible implementation of the fifth aspect, in a third possible implementation of the fifth aspect, the configuration information further includes a cell reselection parameter for performing cell reselection by the UE.

With reference to the fifth aspect to the third possible implementation of the fifth aspect, in a fourth possible implementation of the fifth aspect, the configuration information is carried in a radio resource control (RRC) message by the first network side device, and the RRC message includes an RRC connection establishment message, an RRC reconfiguration message, or an RRC connection release message.

With reference to the fifth aspect to the fourth possible implementation of the fifth aspect, in a fifth possible implementation of the fifth aspect, in a process in which the processing unit is configured to perform cell reselection, when it is determined that the UE needs to send uplink data to a network side and/or needs to receive downlink data from the network side, the processing unit is further configured to restore the UE to the connection state; and the UE further includes: a sending unit, configured to send the uplink data to a network side device that has been restored to the connection state; and/or the receiving unit is configured to receive the downlink data from the network side device that has been restored to the connection state, where the network side device that has been restored to the connection state includes the first network side device or the second network side device.

With reference to the fifth possible implementation of the fifth aspect, in a sixth possible implementation of the fifth aspect, the processing unit is specifically configured to:

if the cell of the UE does not change, send a scheduling request or a random access request to the first network side device by using the sending unit, to restore the UE to the connection state.

With reference to the fifth possible implementation of the fifth aspect, in a seventh possible implementation of the fifth aspect, when the processing unit is configured to restore the UE to the connection state, the sending unit is further configured to send an RRC resume request message to the first network side device or the second network side device, where the RRC resume request message includes at least one of cell information of the first network side device, a cell radio network temporary identity (C-RNTI) of the UE, or indication information for requesting to restore the UE to the connection state;

the receiving unit is further configured to receive an RRC resume confirmation message sent by the first network side device or the second network side device, where the RRC resume confirmation message is used to indicate that the UE is restored to the connection state; and the sending unit is further configured to send an RRC connection resume completion message to the first network side device or the second network side device.

According to a sixth aspect, a first network side device is provided, including:

a sending unit, configured to send configuration information to a user equipment (UE), where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list, where the sending unit is further configured to send the context information of the UE to a network side device in the list.

With reference to the sixth aspect, in a first possible implementation of the sixth aspect, the configuration information is further used to indicate that: after the UE enters the intermediate state, if the UE moves and the cell movement range falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the sixth aspect or the first possible implementation of the sixth aspect, in a second possible implementation of the sixth aspect, the configuration information further includes a condition under which the first network side device instructs the UE to enter the intermediate state according to the configuration information, and the condition includes entering the intermediate state immediately or entering the intermediate state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the sixth aspect to the second possible implementation of the sixth aspect, in a third possible implementation of the sixth aspect, the configuration information further includes a cell reselection parameter for performing cell reselection by the UE.

With reference to the sixth aspect to the third possible implementation of the sixth aspect, in a fourth possible implementation of the sixth aspect, the sending unit is specifically configured to:

send the configuration information to the UE by using a radio resource control (RRC) message, where the RRC message includes an RRC reconfiguration message or an RRC connection release message.

With reference to the sixth aspect to the fourth possible implementation of the sixth aspect, in a fifth possible implementation of the sixth aspect, the sending unit is further configured to send the context information of the UE to a core network device; and the first network side device further includes: a processing unit, configured to release the context information of the UE when the first network side device stores the context information of the UE for a preset time.

With reference to the sixth aspect to the fifth possible implementation of the sixth aspect, in a sixth possible implementation of the sixth aspect, the first network side device further includes:

a receiving unit, configured to receive an RRC resume request message sent by the UE, where the RRC resume request message includes at least one of cell information of the first network side device, a cell radio network temporary identity (C-RNTI) of the UE, or indication information for requesting to restore the UE to the connection state, where the sending unit is further configured to send an RRC resume confirmation message to the UE, where the RRC resume confirmation message includes a parameter for extending, deleting, or modifying the context information of the UE by the first network side device; and the receiving unit is further configured to receive an RRC connection resume completion message sent by the UE.

With reference to the sixth aspect to the sixth possible implementation of the sixth aspect, in a seventh possible implementation of the sixth aspect, the receiving unit is further configured to receive an uplink scheduling request or a random access request sent by the UE; and the sending unit is further configured to send an uplink resource to the UE, where the uplink resource is used by the UE to send uplink data to the first network side device or to receive downlink data from the first network side device according to the uplink resource.

According to a seventh aspect, a second network side device is provided, including:

a receiving unit, configured to receive indication information of a user equipment (UE) in an intermediate state that is sent by a first network side device, where the intermediate state means that: when the UE stores context information of the UE, if the UE moves and a cell movement range falls within a coverage area of a cell or a base station included in a list sent by the first network side device, the UE performs cell reselection according to the list; and an obtaining unit, configured to obtain the context information of the UE from the first network side device, or obtain the context information of the UE from the second network side device when a radio resource control (RRC) resume request message sent by the UE is received, so as to receive uplink data from the UE or send downlink data to the UE.

With reference to the seventh aspect, in a first possible implementation of the seventh aspect, the receiving unit is further configured to:

receive and save context information of the UE that is sent by the first network side device.

With reference to the seventh aspect or the first possible implementation of the seventh aspect, in a second possible implementation of the seventh aspect, the obtaining unit is specifically configured to:

if the second network side device does locally store the context information of the UE before the second network side device receives the RRC resume request message sent by the UE, obtain the context information of the UE from the second network side device; or if the second network side device does not locally store the context information of the UE before the second network side device receives the RRC resume request message sent by the UE, obtain the context information of the UE from the first network side device, where the RRC resume request message is used to be sent to the second network side device when the UE is restored from the intermediate state to a connection state.

With reference to the seventh aspect to the second possible implementation of the seventh aspect, in a third possible implementation of the seventh aspect, the second network side device further includes: a sending unit, configured to: when the second network side device receives a paging message sent by a core network device and determines that there is the downlink data that needs to be sent to the UE, send the paging message to the UE, and after the second network side device establishes an RRC connection to the UE, send, to the UE, the downlink data received from the core network device; or the sending unit, configured to: when a paging message sent by the first network side device is received and it is determined that there is the downlink data that needs to be sent to the UE, send the paging message to the UE, and after the second network side device establishes an RRC connection to the UE, send, to the UE, the downlink data received from the first network side device.

According to an eighth aspect, a core network device is provided, including:

a receiving unit, configured to receive indication information of a user equipment (UE) in an intermediate state that is sent by the UE, where the intermediate state means that: when the UE stores context information of the UE, if the UE moves and a cell movement range falls within a coverage area of a cell or a base station included in a list sent by a first network side device to the UE, the UE performs cell reselection according to the list; and a sending unit, configured to: if the core network device needs to transmit downlink data to the UE, send a paging message to at least one network side device in the list, to send the downlink data to the UE by using a first network side device or a second network side device that is in the at least one network side device and that is connected to the UE; or send the downlink data to the first network side device, to send the downlink data to the UE by using the first network side device; or send the downlink data to at least one network side device in the list, to send the downlink data to the UE by using the at least one network side device.

With reference to the eighth aspect, in a first possible implementation of the eighth aspect, the receiving unit is further configured to receive and save context information of the UE that is sent by the first network side device.

According to a ninth aspect, user equipment is provided, including:

a receiver, configured to receive configuration information sent by a first network side device, where the configuration information includes a list, and the list is a cell list or a base station list; and a processor, configured to enter an intermediate state according to the configuration information, where the intermediate state means that: when the UE stores context information of the UE, if the UE moves and a cell movement range falls within a coverage area of a cell or a base station included in the list, the UE performs cell reselection according to the list.

With reference to the ninth aspect, in a first possible implementation of the ninth aspect, the intermediate state further means that: if the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the ninth aspect or the first possible implementation of the ninth aspect, in a second possible implementation of the ninth aspect, the configuration information further includes a condition under which the first network side device instructs the UE to enter the intermediate state according to the configuration information, and the condition includes entering the intermediate state immediately or entering the idle state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the ninth aspect to the second possible implementation of the ninth aspect, in a third possible implementation of the ninth aspect, the configuration information further includes a cell reselection parameter for performing cell reselection by the UE.

With reference to the ninth aspect to the third possible implementation of the ninth aspect, in a fourth possible implementation of the ninth aspect, the configuration information is carried in a radio resource control (RRC) message by the first network side device, and the RRC message includes an RRC connection establishment message, an RRC reconfiguration message, or an RRC connection release message.

With reference to the ninth aspect to the fourth possible implementation of the ninth aspect, in a fifth possible implementation of the ninth aspect, in a process in which the processor is configured to perform cell reselection, when it is determined that the UE needs to send uplink data to a network side and/or needs to receive downlink data from the network side, the processor is further configured to restore the UE to the connection state; and the UE further includes: a transmitter, configured to send the uplink data to a network side device that has been restored to the connection state; and/or the receiver is configured to receive the downlink data from the network side device that has been restored to the connection state, where the network side device that has been restored to the connection state includes the first network side device or the second network side device.

With reference to the fifth possible implementation of the ninth aspect, in a sixth possible implementation of the ninth aspect, the transmitter is specifically configured to:

if the cell of the UE does not change, send a scheduling request or a random access request to the first network side device, to restore the UE to the connection state.

With reference to the fifth possible implementation of the ninth aspect, in a seventh possible implementation of the ninth aspect, the transmitter is further configured to send an RRC resume request message to the first network side device or the second network side device, where the RRC resume request message includes at least one of cell information of the first network side device, a cell radio network temporary identity (C-RNTI) of the UE, or indication information for requesting to restore the UE to the connection state;

the receiver is further configured to receive an RRC resume confirmation message sent by the first network side device or the second network side device, where the RRC resume confirmation message is used to indicate that the UE is restored to the connection state; and the transmitter is further configured to send an RRC connection resume completion message to the first network side device or the second network side device.

According to a tenth aspect, a first network side device is provided, including:

a transmitter, configured to send configuration information to a user equipment (UE), where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list, where the transmitter is further configured to send the context information of the UE to a network side device in the list.

With reference to the tenth aspect, in a first possible implementation of the tenth aspect, the configuration information is further used to indicate that: after the UE enters the intermediate state, if the UE moves and the cell movement range falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

With reference to the tenth aspect or the first possible implementation of the tenth aspect, in a second possible implementation of the tenth aspect, the configuration information further includes a condition under which the first network side device instructs the UE to enter the intermediate state according to the configuration information, and the condition includes entering the intermediate state immediately or entering the intermediate state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

With reference to the tenth aspect to the second possible implementation of the tenth aspect, in a third possible implementation of the tenth aspect, the configuration information further includes a cell reselection parameter for performing cell reselection by the UE.

With reference to the tenth aspect to the second possible implementation of the tenth aspect, in a third possible implementation of the tenth aspect, the transmitter is specifically configured to:

send the configuration information to the UE by using a radio resource control (RRC) message, where the RRC message includes an RRC reconfiguration message or an RRC connection release message.

With reference to the tenth aspect to the third possible implementation of the tenth aspect, in a fourth possible implementation of the tenth aspect, the transmitter is further configured to send the context information of the UE to a core network device; and the first network side device further includes: a processor, configured to release the context information of the UE when the first network side device stores the context information of the UE for a preset time.

With reference to the tenth aspect to the fourth possible implementation of the tenth aspect, in a fifth possible implementation of the tenth aspect, the first network side device further includes:

a receiver, configured to receive an RRC resume request message sent by the UE, where the RRC resume request message includes at least one of cell information of the first network side device, a cell radio network temporary identity (C-RNTI) of the UE, or indication information for requesting to restore the UE to the connection state, where the transmitter is further configured to send an RRC resume confirmation message to the UE, where the RRC resume confirmation message includes a parameter for extending, deleting, or modifying the context information of the UE by the first network side device; and the receiver is further configured to receive an RRC connection resume completion message sent by the UE.

With reference to the tenth aspect to the fifth possible implementation of the tenth aspect, in a sixth possible implementation of the tenth aspect, the receiver is further configured to receive an uplink scheduling request or a random access request sent by the UE; and the transmitter is further configured to send an uplink resource to the UE, where the uplink resource is used by the UE to send uplink data to the first network side device or to receive downlink data from the first network side device according to the uplink resource.

According to an eleventh aspect, a second network side device is provided, including:

a receiver, configured to receive indication information of a user equipment (UE) in an intermediate state that is sent by a first network side device, where the intermediate state means that: when the UE stores context information of the UE, if the UE moves and a cell movement range falls within a coverage area of a cell or a base station included in a list sent by the first network side device, the UE performs cell reselection according to the list; and a processor, configured to obtain the context information of the UE from the first network side device, or obtain the context information of the UE from the second network side device when the receiver receives a radio resource control (RRC) resume request message sent by the UE, so as to receive uplink data from the UE or send downlink data to the UE.

With reference to the eleventh aspect, in a first possible implementation of the eleventh aspect, the receiver is further configured to receive and save context information of the UE that is sent by the first network side device.

With reference to the eleventh aspect or the first possible implementation of the eleventh aspect, in a second possible implementation of the eleventh aspect, the processor is specifically configured to: if a memory does not store the context information of the UE when the receiver receives the radio resource control (RRC) resume request message sent by the UE, obtain the context information of the UE from the memory; or if a memory does not store the context information of the UE before the receiver receives the RRC resume request message sent by the UE, obtain the context information of the UE from the first network side device, where the RRC resume request message is used to be sent to the second network side device when the UE is restored from the intermediate state to a connection state.

With reference to the eleventh aspect to the second possible implementation of the eleventh aspect, in a third possible implementation of the eleventh aspect, the second network side device further includes: a transmitter, configured to: when the second network side device receives a paging message sent by a core network device and determines that there is the downlink data that needs to be sent to the UE, send the paging message to the UE, and after the second network side device establishes an RRC connection to the UE, send, to the UE, the downlink data received from the core network device; or the transmitter, configured to: when a paging message sent by the first network side device is received and it is determined that there is the downlink data that needs to be sent to the UE, send the paging message to the UE, and after the second network side device establishes an RRC connection to the UE, send, to the UE, the downlink data received from the first network side device.

According to a twelfth aspect, a core network device is provided, including:

a receiver, configured to receive indication information of a user equipment (UE) in an intermediate state that is sent by the UE, where the intermediate state means that: when the UE stores context information of the UE, if the UE moves and a cell movement range falls within a coverage area of a cell or a base station included in a list sent by a first network side device to the UE, the UE performs cell reselection according to the list; and a transmitter, configured to: if the core network device needs to transmit downlink data to the UE, send a paging message to at least one network side device in the list, to send the downlink data to the UE by using a first network side device or a second network side device that is in the at least one network side device and that is connected to the UE; or send the downlink data to the first network side device, to send the downlink data to the UE by using the first network side device; or send the downlink data to at least one network side device in the list, to send the downlink data to the UE by using the at least one network side device.

With reference to the twelfth aspect, in a first possible implementation of the twelfth aspect, the receiver is further configured to receive and save context information of the UE that is sent by the first network side device.

The embodiments of the present disclosure provide a signaling optimization method and a device. UE receives configuration information sent by a first network side device. The configuration information includes a list. The list is a cell list or a base station list. The UE enters an intermediate state according to the configuration information. The intermediate state means that: when the UE stores context information of the UE, if the UE moves and a cell movement range falls within a coverage area of a cell or a base station included in the list, the UE performs cell reselection according to the list. In this way, in comparison with the prior art, in the embodiments of the present disclosure, UE does not perform a cell handover, but cell reselection is performed, so as to reduce signaling overheads of the UE and a network side. In the prior art, UE is restored from an idle state to a connection state, and context of the UE is re-established. In comparison with the prior art, in the embodiments of the present disclosure, even if the UE needs to be restored from an intermediate state to a connection state, because UE stores context information of the UE, the UE does not need to re-establish an RRC connection to a network side and establish the context information. Therefore, a problem of heavy signaling overheads and a long data transmission delay when UE accesses a network side in the prior art can be resolved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

FIG. 1 is a schematic diagram of an LTE system according to an embodiment of the present disclosure;

FIG. 2 is a schematic flowchart of a signaling optimization method according to an embodiment of the present disclosure;

FIG. 3 is a schematic flowchart of a signaling optimization method according to an embodiment of the present disclosure;

FIG. 4 is a schematic flowchart of a signaling optimization method according to an embodiment of the present disclosure;

FIG. 7a-1 and FIG. 7a-2 are a schematic flowchart of a signaling optimization method according to an embodiment of the present disclosure;

DESCRIPTION OF EMBODIMENTS

Figure 5:
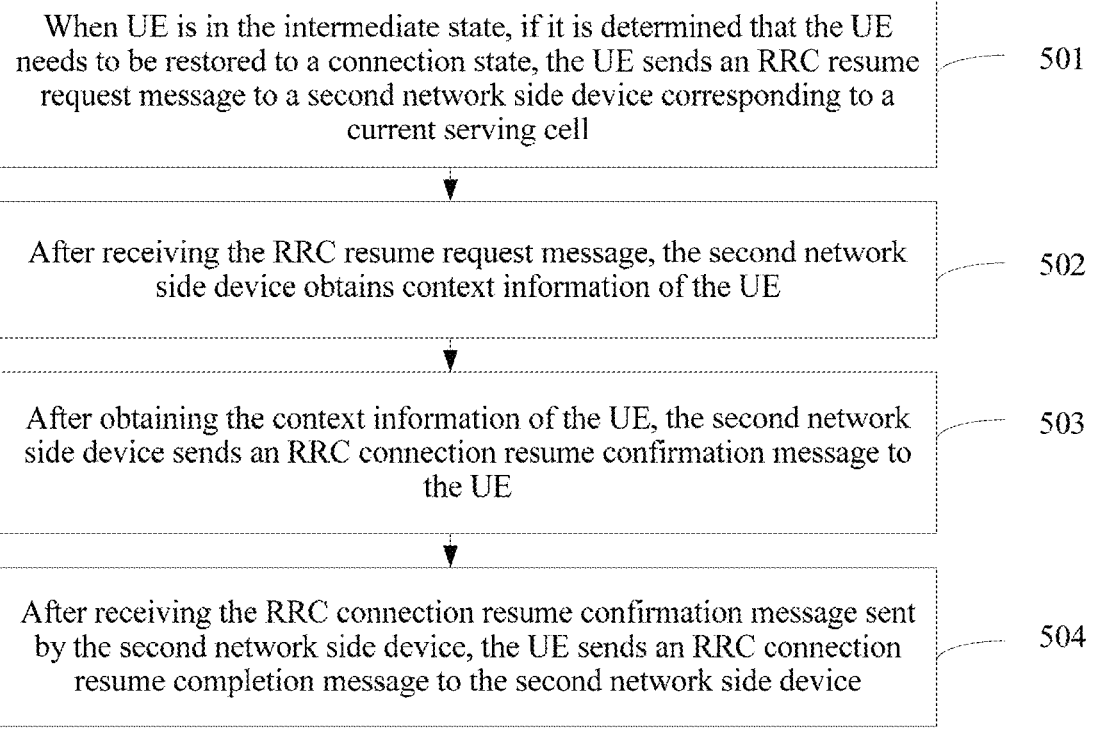
FIG. 5 is a schematic flowchart of a signaling optimization method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In a wireless communications system, a cell handover in the embodiments of the present disclosure is channel switching that needs to be performed to ensure that communication of a mobile user is not interrupted when a mobile station moves from a cell (a base station or a coverage area of a base station) to another cell.

Cell reselection in the embodiments of the present disclosure means that the UE in an idle state needs to monitor a signal of a current cell and a neighboring cell, such as a signal level, signal strength, and signal quality, and select, as a current serving cell, a cell with relatively high strength or quality or a cell whose signal strength or signal quality reaches a threshold.

An embodiment of the present disclosure provides a signaling optimization method. As shown in FIG. 2, the method includes the following steps.

201. A user equipment (UE) receives configuration information sent by a first network side device, where the configuration information includes a list, and the list is a cell list or a base station list.

Specifically, the cell list includes a cell identifier of at least one cell, and the base station list includes a base station identifier of at least one base station.

It can be understood that the foregoing cell list or the base station list may also be replaced with a tracking area or a tracking area list. This is not limited in the present disclosure.

Optionally, the configuration information may further include information that instructs the UE to enter an intermediate state.

202. The UE enters an intermediate state according to the configuration information, where the intermediate state means that: when the UE stores context information of the UE, if the UE moves and a cell movement range falls within a coverage area of a cell or a base station included in the list, the UE performs cell reselection according to the list.

The context information of the UE includes at least information that the UE is in the intermediate state. If the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state. The network side device on which the current serving cell is located is the first network side device or a second network side device after the UE performs cell reselection.

The network side device may be an evolved NodeB eNB, a base station, a radio network controller, or the like. When the UE establishes an RRC connection to the base station to be in the connection state, a signaling radio bearer (SRB) 1 is established between the UE and the network side device. The network side device stores the context information of the UE, and further includes information about whether the UE is in the intermediate state. Then, in step 201, the UE receives the configuration information sent by the first network side device. The configuration information may be the cell list or the base station list. The cell list may be a list of neighboring cells of a cell in which the UE is currently located, and may also include multiple cells at a distance from the cell in which the UE is currently located. For example, the cell list includes cell identifiers of a neighboring cell and a separated cell. The base station list is similar to the cell list. The base station list may include an identifier of a base station that is neighboring to a base station in which the UE is currently located and an identifier of a base station at a distance from the base station in which the UE is currently located. The cell list may also be the tracking area or the tracking area list. The tracking area or the tracking area list is corresponding to or includes the cell list. This is not limited in the present disclosure.

The list is used to indicate that: if the UE moves and moves within a range of the list, the UE may automatically perform cell reselection, and does not need to notify the network side device; or if the UE moves outside a range of the list, the UE needs to notify the network side device. In the prior art, if the UE is in the connection state and moves from a cell to another cell, a cell handover needs to be performed; and if the UE is in the idle state and moves from a cell to another cell, cell reselection needs to be performed. In comparison with the prior art, in the embodiments of the present disclosure, when the UE in the connection state receives configuration information sent by the network side device, cell reselection is performed if the cell changes, that is, the UE is intermediate between the connection state and the idle state. Therefore, in step 201 and 202, the UE may enter the intermediate state according to the configuration information. The intermediate state means that: when the UE stores the context information, if the UE moves and a cell movement range falls within the list, the UE performs cell reselection; or if a cell movement range of the UE falls beyond the list, the UE sends a notification message to the network side device, so that the UE is restored from the intermediate state to the connection state or returns to the idle state.

In the prior art, if a cell changes when the UE is in a connection state, a cell handover needs to be performed. A process of the cell handover includes interaction between the UE and a network side device such as an eNB. The UE reports a measurement report to the network side device after a requirement is met. Then, the network side device performs handover determining in combination with an algorithm policy. Finally, the UE performs a cell handover. However, in the embodiments of the present disclosure, if a cell changes when UE is in a connection state, a cell handover is not performed, but a cell reselection process is performed. In this way, the UE does not need to communicate with a network side, but the UE automatically performs cell reselection according to a cell reselection criterion, so as to reduce signaling overheads when the UE moves, and save power for the UE. In the prior art, when UE is in an idle state when no data needs to be sent, the UE releases context information of the UE, and needs to re-establish an RRC connection to a network side when there is data that needs to be sent. However, in the embodiments of the present disclosure, UE stores context information of the UE, and when the UE needs to be restored from an intermediate state to a connection state, to perform data transmission, the UE does not need to execute a process of re-establishing the context information with a network side device, so as to reduce signaling overheads, shorten a data transmission delay, and save power for the UE.

Corresponding to the foregoing embodiment, an embodiment of the present disclosure provides a signaling optimization method. As shown in FIG. 3, the method includes the following steps.

301. A first network side device sends configuration information to the UE, where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list.

The context information of the UE includes at least information that the UE is in the intermediate state.

302. The first network side device sends the context information to a network side device in the list.

The first network side device still stores the context information of the UE. Further, the first network side device may send the context information of the UE to the network side device in the list. Therefore, when the UE performs cell reselection to a cell of another network side device in the list, the UE does not need to establish the context information of the UE with the another network side device.

This step is optional.

This embodiment of the present disclosure provides a signaling optimization method. The UE receives configuration information sent by a first network side device. The configuration information includes a list. The list is a cell list or a base station list. The UE enters an intermediate state according to the configuration information. The intermediate state means that: when the UE stores context information of the UE, if the UE moves and a cell movement range falls within a coverage area of a cell or a base station included in the list, the UE performs cell reselection according to the list; or if the cell movement range of the UE falls beyond the list, the UE sends a notification message to the first network side device, so that the UE is restored from the intermediate state to a connection state or an idle state. In comparison with the prior art, in the embodiments of the present disclosure, UE in a connection state does not perform cell handover, but performs cell reselection. In the prior art, UE re-establishes context of the UE when the UE is restored from an idle state to a connection state. In comparison with the prior art, in the embodiments of the present disclosure, because UE stores context information of the UE, in a process in which the UE is restored from an intermediate state to a connection state, an RRC connection to a network side does not need to be re-established, and the context information does not need to be established. Therefore, a problem of heavy signaling overheads and a long data transmission delay when UE accesses a network side in the prior art can be resolved.

The following further describes the embodiments of the present disclosure, and provides a signaling optimization method. As shown in FIG. 4, the method includes the following steps.

401. The UE establishes an RRC connection to a first network side device, and enters an RRC connection state.

Specifically, the UE may send random access code to the first network side device, receive a random access response sent by the first network side device, send an RRC connection establishment request message to the first network side device according to an uplink grant in the random access response, and then receive an RRC connection establishment message sent by the first network side device. The UE adopts a configuration parameter in the RRC connection establishment message, and sends an RRC connection establishment completion message to the first network side device. The UE enters the RRC connection state. In this way, the UE and the first network side device establish context information of the UE, including a signaling radio bearer SRB 1.

The context information of the UE may include: an identifier of the UE, for example, a cell radio network temporary identity (C-RNTI) allocated by the first network side device to the UE; radio bearer configuration information of the UE, for example, an SRB and/or a data radio bearer (DRB); a Media Access Control (MAC) layer configuration parameter of the UE, for example, buffer status report (BSR) parameter configuration, power headroom report (PHR) parameter configuration, and a discontinuous reception (DRX); physical layer parameter configuration of the UE, for example, parameter configuration related to each physical layer channel; or a security-related parameter of the UE, for example, a security key, and a security algorithm.

This step is optional.

402. The first network side device sends configuration information to the UE, where the configuration information includes a list, and the list is a cell list or a base station list.

Optionally, the configuration information may further include information that instructs the UE to enter an intermediate state.

The cell list or the base station list is used to indicate that: if the UE moves and a movement range falls within the list, the UE may automatically perform cell reselection, and does not need to notify a network side device; or further used to indicate that if the UE moves and a movement range falls beyond the list, the UE needs to notify a network side device.

Optionally, the configuration information may be carried in a system broadcast message by the first network side device, or may be carried in a dedicated message. The dedicated message may be carried in a radio resource control (RRC) message. The RRC message may be an RRC connection establishment message, an RRC reconfiguration message, or an RRC connection release message, or another new RRC message. This is not limited in the present disclosure. Optionally, the configuration information may be carried in another message such as a MAC layer message, or may be carried in a physical layer (PHY) message. The configuration information may be carried in a message, or may be separately carried in multiple messages, for example, a combination of a system broadcast message and a dedicated message. This is not limited in the present disclosure.

403. The UE enters an intermediate state according to the configuration information, where the intermediate state means that: when the UE stores context information of the UE, if the UE moves and a cell movement range falls within the list, the UE performs cell reselection according to the list.

Alternatively, if a cell movement range of the UE falls beyond the list, the UE sends a notification message to the first network side device, so that the UE is restored from an intermediate state to the connection state.

Specifically, that the UE stores the context information means that the UE stores one or more of radio bearer parameter configuration information, MAC layer parameter configuration information, physical resource configuration information, a maintained timer, or status variable information.

The configuration information may also include a condition under which the first network side device instructs the UE to enter the intermediate state. The condition may be using the configuration information immediately, that is, the UE enters the intermediate state immediately; or may be using the configuration information after a preset time, that is, the UE enters the intermediate state after the preset time; or may be that the UE uses the configuration information when there is no data transmission in a specific time, to enter the intermediate state; or the like.

Optionally, the configuration information may further include a time period in which the first network side device instructs the UE to enter the intermediate state according to the configuration information, and/or an operation instruction performed after the UE enters the intermediate state during the time period according to the configuration information. The operation instruction may be used to instruct the UE to enter the idle state and/or instruct the UE to notify the first network side device of current location information of the UE.

404. After the UE enters the intermediate state, if the UE moves and a cell movement range falls within the list, the UE performs cell reselection.

Specifically, the UE may perform cell reselection based on a cell reselection criterion, for example, the UE camps on a current serving cell for more than 1 s, or a cell selection evaluation measurement value of a current serving cell is less than a reselection threshold of an intra-frequency cell, an inter-frequency cell, an inter-system cell, or the like.

A cell reselection parameter for performing cell reselection by the UE may be obtained by receiving, by the UE, a system broadcast message of a serving cell in which the UE is located. For example, if the current serving cell of the UE is a cell 1, the UE may read a system broadcast message of the cell 1 to obtain a cell reselection parameter for reselecting another cell instead of the cell 1; and when reselecting a cell 2 instead of the cell 1, the UE reads a system broadcast message of the cell 2 to obtain a cell reselection parameter for reselecting another cell instead of the cell 2. Optionally, the cell reselection parameter may be carried in the configuration information sent by the first network side device. For example, a set of cell reselection parameters is notified, or each cell in the list is notified of a set of cell reselection parameters. Alternatively, the cell reselection parameter may be obtained by using a system broadcast message of a cell that receives the configuration information.

405. The first network side device sends the context information of the UE to a network side device in the list.

The context information of the UE may include indication information of the UE in the intermediate state. Alternatively, the first network side device separately sends the indication information of the UE in the intermediate state and the context information of the UE to the network side device in the list.

After the first network side device sends the configuration information to the UE, the first network side device may send the context information of the UE to the network side device in the list, so that the network side device in the list also stores the context information of the UE. In this way, when reselecting another network side device in the list, the UE may not establish the context information of the UE with the another network side device.

Optionally, the first network side device may send the context information of the UE to a core network device, for example, to a mobility management entity (MME), so that the core network device stores the context information of the UE.

For example, the first network side device may send the context information of the UE to the network side device in the list by using an X2 interface, or send the context information of the UE to the network side device in the list by using the core network device through an S1 interface. This is not limited in the present disclosure.

Optionally, the first network side device and/or the network side device in the list may release the context information of the UE when context information of the UE that is stored the first network side device and/or the network side device in the list reaches a configured time length, that is, the context information of the UE is not stored.

It can be understood that the first network side device and the network side device in the list may be a same network side device. In this case, this step is implemented inside a network side.

This step is optional.

In the prior art, if a cell changes, the UE in a connection state performs a cell handover. In this way, in comparison with the prior art, in the embodiments of the present disclosure, UE may be in an intermediate state when receiving configuration information; if a cell changes, the UE needs to perform cell reselection, so as to avoid signaling exchange with a network side, and reduce signaling overheads; context information of the UE is stored, so that when being restored to a connection state, the UE does not need to establish the context information of the UE with the network side, so as to further reduce signaling overheads.

Further, if the UE is in the intermediate state, the UE needs to be restored from the intermediate state to the connection state when the UE needs to transmit data, perform a tracking area update (TAU), or the like.

For example, the UE needs to be restored to the connection state when the UE in the intermediate state determines that there is uplink data that needs to be sent to a second network side device. Specifically, for example, when there is data reaching a packet data convergence protocol (PDCP) layer, an RRC layer may be notified by using the PDCP layer; or when there is data reaching an internet protocol (IP) layer, an RRC layer may be notified by the IP layer, so that the RRC layer is connected to the network side, to restore the UE to the connection state.

Alternatively, the UE in the intermediate state needs to be restored from the intermediate state to the connection state when the UE in the intermediate state determines that there is downlink data that needs to be received. For example, the UE is restored to the connection state when receiving a paging message sent by a network side device.

Alternatively, the UE in the intermediate state needs to be restored to the connection state when the UE in the intermediate state needs to perform tracking area update (TAU). For example, a TAU program needs to be executed when the TAU is periodically performed, or when a tracking area identity (TAI) is not in a TA list obtained when the UE performs registration.

Alternatively, the UE is restored to the connection state when being in the intermediate state for a preset time length.

Alternatively, the UE is restored to the connection state when a cell in which the UE is currently located is not in a list sent by the network side device; or the like.

Based on the foregoing steps 401 to 405, as shown in FIG. 5, the method further includes the following steps.

501. If it is determined that the UE needs to be restored to the connection state, the UE in the intermediate state sends an RRC resume request message to a second network side device corresponding to a current serving cell.

The RRC resume request message includes first cell information. Specifically, if the cell of the UE does not change, the second network side device is the same as the first network side device, and the first cell information included in the RRC resume request message may be cell information of the second network side device or the first network side device. Alternatively, if the cell of the UE changes and the UE moves to a cell of the second network side device in the list, the first network side device is different from the second network side device, and the cell information included in the RRC resume request message may be cell information of the first network side device, and specifically, may be a serving cell that sends the configuration information to the UE. It can be understood that when the cell of the UE does not change, the RRC resume request message may not include the first cell information.

In addition, the RRC resume request message may further include a C-RNTI corresponding to the UE. The C-RNTI may be sent by the first network side device that sends the configuration information to the UE; or may be allocated to the UE by a second network side device that receives the configuration information from the first network side device, and be sent by using the first network side device. It can be understood that when the cell of the UE does not change, the RRC resume request message may not include the first cell information and/or the C-RNTI corresponding to the UE.

The RRC resume request message may further include indication information for requesting to restore the UE to the connection state. For example, the indication information may perform indication by using a message type of the RRC resume request message, and this type indicates that the UE requests to be restored to the connection state. Alternatively, the indication information may perform indication by using a cause value carried in the RRC resume request message, and the cause value indicates that the UE needs to be restored to the connection state. Alternatively, the indication information may be carried by using a logical channel identifier (LCID) in a MAC header of the RRC resume request message. This is not limited in the present disclosure.

Optionally, encryption and/or integrity protection may be performed on the RRC resume request message by using a security parameter. The security parameter is configured for the UE and sent to the UE by the first network side device; or the security parameter is configured by the second network side device for the UE and sent to the UE by using the first network side device. Further, optionally, the RRC resume request message may be sent by using the SRB 1 established between the first network side device and the UE.

502. After receiving the RRC resume request message, the second network side device obtains the context information of the UE.

Specifically, the second network side device may first determine whether the second network side device stores the context information of the UE. If the second network side device stores the context information of the UE, the second network side device may directly obtain the context information from the second network side device. In this case, the second network side device and the first network side device may be a same device, that is, the cell of the UE does not change; or the second network side device may be any network side device in the list. If the second network side device does not store the context information of the UE, the second network side device may request the context information from the first network side device. For example, it is possible that the UE needs to be restored to the connection state before the first network side device notifies the second network side device of the context information of the UE. For example, the second network side device may send a context obtaining request message to the first network side device by using the X2 interface to obtain the context information of the UE. The message may carry the C-RNTI of the UE. Optionally, the context information of the UE may be obtained by requesting the core network device by the second network side device by using the S1 interface.

Optionally, the first network side device may release the context information of the UE after sending context information of the UE to the second network side device.

It can be understood that another behavior of the second network side device includes: The second network side device may reject the RRC connection resume request message of the UE, and specifically, may send an RRC connection resume rejection message to the UE.

Further, optionally, the second network side device instructs the first network side device to release the context information of the UE.

Further, optionally, the UE returns to the idle state after receiving the RRC connection resume rejection message.

503. After obtaining the context information of the UE, the second network side device sends an RRC connection resume confirmation message to the UE.

Optionally, the RRC connection resume confirmation message may include a changed parameter in the context information of the UE, for example, a newly-added, deleted, or modified parameter. An unchanged parameter may be not carried in the RRC connection resume confirmation message. Alternatively, the RRC connection resume confirmation message may include all parameters of the context information of the UE, including both the changed parameter and the unchanged parameter.

The RRC connection resume confirmation message may be transmitted by using the SRB 1, for example, may use a parameter of the SRB 1 established between the first network side device and the UE.

504. After receiving the RRC connection resume confirmation message sent by the second network side device, the UE sends an RRC connection resume completion message to the second network side device.

This step is optional.

Further, optionally, the second network side device may send a path switching request message to the core network device. The path switching request message is used to request the core network device to switch a data channel from a path between the first network side device and the core network device to a path between the second network side device and the core network device, so that a core network learns that a network side device of the serving cell in which the UE is currently located is the second network side device. Further, the core network device sends a path switching confirmation message to the second network side device. In this way, data transmission can be performed between the UE, the second network side device, and the core network device.

Further, optionally, after path switching, the second network side device instructs the first network side device to release the context information of the UE; or the core network device instructs the first network side device to release the context information of the UE.

Further, a network side device in a cell list of the first network side device releases the context information of the UE.

In the prior art, when UE is in an idle state, context information of the UE is released. If the UE needs to be restored to a connection state, the context information of the UE needs to be re-established. The UE and a network side need to perform signaling transmission for multiple times. This brings a long data transmission delay. In comparison with the process in which the UE is restored from the idle state to the connection state in the prior art, in the embodiments of the present disclosure, if UE is restored from an intermediate state to a connection state, the UE sends an RRC resume request message to a network side device, and receives an RRC connection resume confirmation message sent by the network side device; then, the UE sends an RRC connection resume completion message to the network side device, so that the UE can be restored from the intermediate state to the connection state, and further send data. In this way, signaling overheads in an RRC connection resume process are reduced, and a data transmission delay is shortened.

Still further, when the UE is in the intermediate state, a signaling and data transmission processing method may be as follows.

Figure 6:
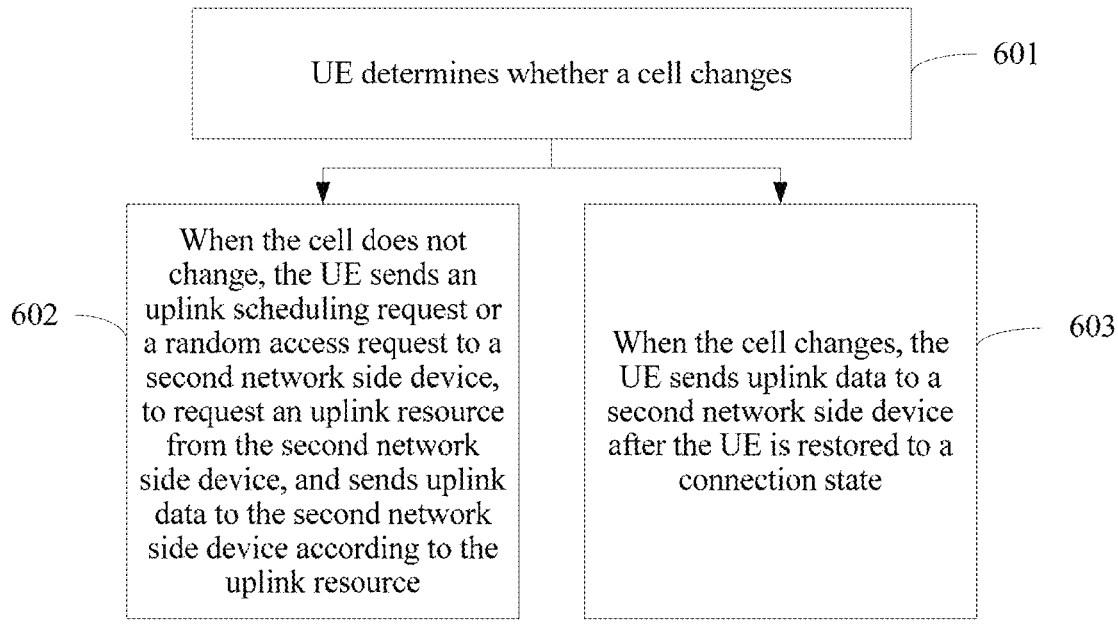
FIG. 6 is a schematic flowchart of a signaling optimization method according to an embodiment of the present disclosure.

As shown in FIG. 6, when there is uplink data that needs to be sent to the network side device or the TAU needs to be performed, the method may further include the following steps.

601. The UE determines whether a cell changes; then, go to step 602 or step 603.

For example, when the cell of the UE does not change, the second network side device is the same as the first network side device; or when a cell in which the UE is located changes, the second network side device may be the same as or different from the first network side device.

It can be understood that when a network side device can simultaneously manage multiple cells, even if the cell of the UE changes, the UE may be on a same network side device. That is, in this case, a second network side device on which the UE is located is the same as the first network side device. This is not limited in the present disclosure.

This step is optional. That is, step 603 is directly performed regardless of whether a cell changes.

602. When the cell does not change, the UE sends an uplink scheduling request or a random access request to the second network side device, to request an uplink resource from the second network side device, and sends uplink data to the second network side device according to the uplink resource.

If the cell does not change, according to a description in step 401, the UE still has the RRC connection to the first network side device (the second network side device), and the UE in the intermediate state may directly request the uplink resource from the first network side device, to send a buffer status report and/or the uplink data to the first network side device. Optionally, the UE keeps using the scheduling request or the random access request to request the uplink resource from the second network side device, and sends the uplink data to the second network side device according to the uplink resource.

Alternatively,

603. When the cell changes, the UE sends uplink data to the second network side device after the UE is restored to the connection state.

Specifically, if the cell changes, that is, when the first network side device is different from the second network side device on which the UE is currently located, because the UE does not establish an RRC connection to the second network side device, the UE first performs the foregoing steps 501 to 504; then sends an uplink scheduling request or a random access request to the second network side device, to request an uplink resource from the second network side device; and sends the uplink data to the second network side device according to the uplink resource. Alternatively, it is possible that after the UE is in the connection state, the second network side device directly allocates an uplink resource to the UE. In this case, the UE does not need to send an uplink scheduling request or a random access request to the second network side device.

The following describes a specific implementation of data sending.

Figures 1, 7A:
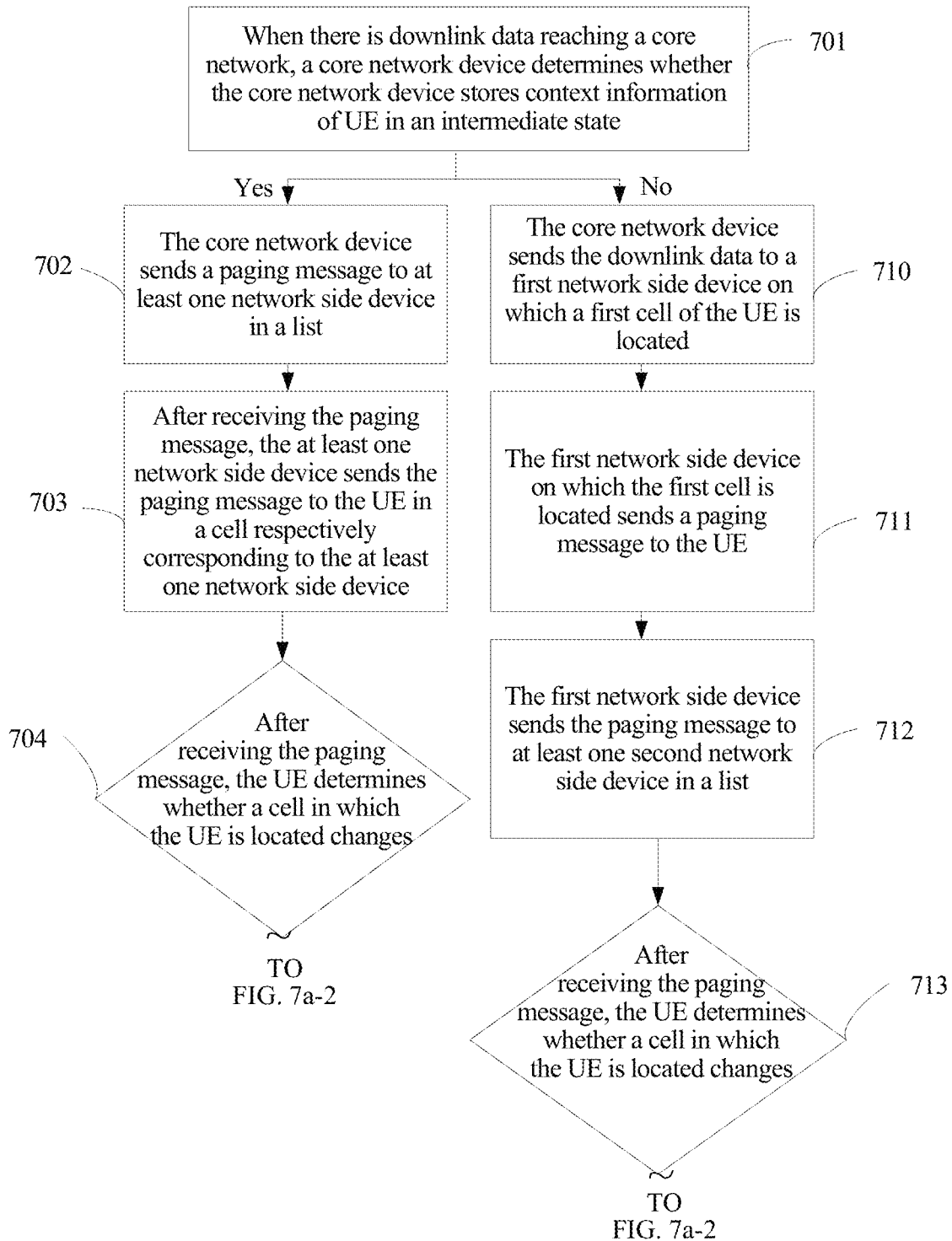
Figures 2, 7A:
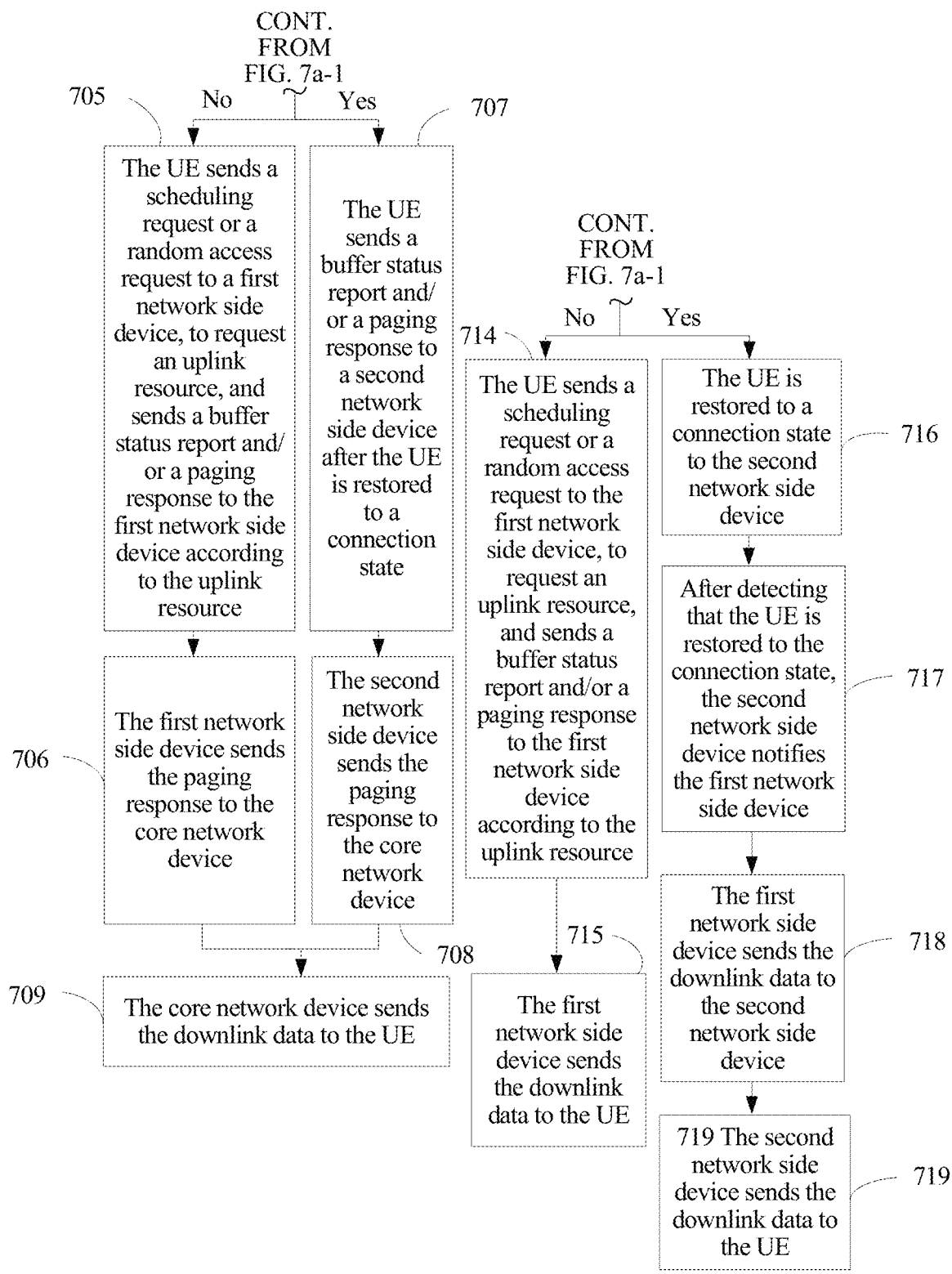

As shown in FIG. 7a-1 and FIG. 7a-2, when there is downlink data that needs to be received by UE from a network side device, the method may further include the following steps.

701. When there is downlink data reaching a core network, a core network device determines whether the core network device stores context information of the UE in an intermediate state; and if the core network device stores the context information of the UE in the intermediate state, steps 702 to 709 are performed, or if the core network device does not store the context information of the UE in the intermediate state, steps 710 to 720 are performed.

Specifically, the context information of the UE in the intermediate state may include at least one of the following:

indication information of the UE in the intermediate state, and a cell list or a network side device list information of the UE in the intermediate state.

When there is downlink data reaching a core network, a first network side device may have already sent the context information of the UE in the intermediate state to the core network device, and the core network device confirms that the UE is in the intermediate state. It is also possible that there is downlink data reaching the core network device before the first network side device sends the context information of the UE in the intermediate state to the core network device. Alternatively, a protocol or the core network device does not support the UE in the intermediate state, and certainly, there is no context information of the UE in the intermediate state.

It can be understood that this step is optional. Specifically, the core network device only determines whether the UE is in a connection state or an idle state. If the UE is in the connection state, steps 710 to 720 are performed. Alternatively, if the UE is in the idle state, a method for processing downlink data when UE is in the idle state in the prior art is performed. This is not limited in the present disclosure.

702. The core network device sends a paging message to at least one network side device in a list.

Because the core network device confirms that the UE is in the intermediate state, the core network device learns that the UE establishes an RRC connection to the first network side device. However, the core network device does not learn whether a cell of the UE changes or which cell the UE moves to. Therefore, the core network device needs to send a paging message to at least one network side device in the list, to obtain a location of a cell in which the UE is currently located.

Specifically, the paging message may include at least one of the following information:
UE identification information, which may be all of or a part of a temporary mobile subscriber identity (S-TMSI), or a C-RNTI;
information about some or all cells in the list; and
indication information of the UE in the intermediate state.

703. After receiving the paging message, the at least one network side device sends the paging message to the UE in a cell respectively corresponding to the at least one network side device.

Specifically, at least one network side device sends, in a cell in a list included in the paging message or in a cell in a list included in obtained context information of the UE, the paging message to the UE.

704. After receiving the paging message, the UE determines whether a cell in which the UE is located changes; and if the cell does not change, step 705 is performed, or if the cell changes, step 707 is performed.

This step is optional. That is, step 707 is performed regardless of whether the cell changes.

705. If the cell does not change, the UE sends a scheduling request or a random access request to a first network side device, to request an uplink resource, and sends a buffer status report and/or a paging response to the first network side device according to the uplink resource.

706. The first network side device sends the paging response to the core network device; then, go to step 709.

707. If the cell changes, the UE sends a buffer status report and/or a paging response to a second network side device after the UE is restored to a connection state.

708. The second network side device sends the paging response to the core network device.

Further, optionally, the second network side device may send a path switching request message to the core network device. The path switching request message is used to request the core network device to switch a data channel from a path between the first network side device and the core network device to a path between the second network side device and the core network device, so that the core network learns that a network side device of the serving cell in which the UE is currently located is the second network side device. Further, the core network device sends a path switching confirmation message to the second network side device. In this way, data transmission can be performed between the UE, the second network side device, and the core network device.

Further, optionally, after path switching, the second network side device instructs the first network side device to release the context information of the UE; or the core network device instructs the first network side device to release the context information of the UE.

Further, a network side device in a cell list of the first network side device releases the context information of the UE.

709. The core network device sends the downlink data to the UE.

Specifically, the core network device first sends the downlink data to a network side device (for example, the network side device may be the first network side device, or may be the second network side device) of a cell in which the UE is restored to an RRC connection. Then, the network side device sends the downlink data to the UE.

710. The core network device sends the downlink data to a first network side device on which a first cell of the UE is located.

The first network side device on which the first cell is located herein is a network side device that sends configuration information including the list to the UE.

711. The first network side device on which the first cell is located sends a paging message to the UE.

712. The first network side device sends the paging message to at least one second network side device in a list.

Specifically, the paging message is transmitted by using an X2 interface, or is transmitted by using a core network device through an S1 interface. This is not limited in the present disclosure.

After receiving the paging message, the at least one second network side device in the list sends the paging message to the UE. (This is similar to step 703.)

Further, optionally, the first network side device sends the downlink data to at least one second network side device in the list.

713. After receiving the paging message, the UE determines whether a cell in which the UE is located changes; and if the cell does not change, steps 714 and 715 are performed, or if the cell changes, step 716 is performed.

This step is optional. That is, step 707 is performed regardless of whether the cell changes.

714. If the cell does not change, the UE sends a scheduling request or a random access request to the first network side device, to request an uplink resource, and sends a buffer status report and/or a paging response to the first network side device according to the uplink resource.

715. The first network side device sends the downlink data to the UE.

Alternatively,

716. If the cell changes, the UE is restored to a connection state to the second network side device.

Further, optionally, the UE sends a buffer status report and/or a paging response to the second network side device.

717. After detecting that the UE is restored to the connection state, the second network side device notifies the first network side device.

This step is optional.

This step can be not performed when the first network side device and the second network side device are a same device.

When the second network side device already receives data sent by the first network side device, step 718 is directly performed.

718. The first network side device sends the downlink data to the second network side device.

This step can be not performed when the first network side device and the second network side device are a same device.

719. The second network side device sends the downlink data to the UE.

720. The first network side device and/or a device other than the second network side device to which the UE is restored to be connected releases context of the UE.

This step is optional.

Figure 7B:
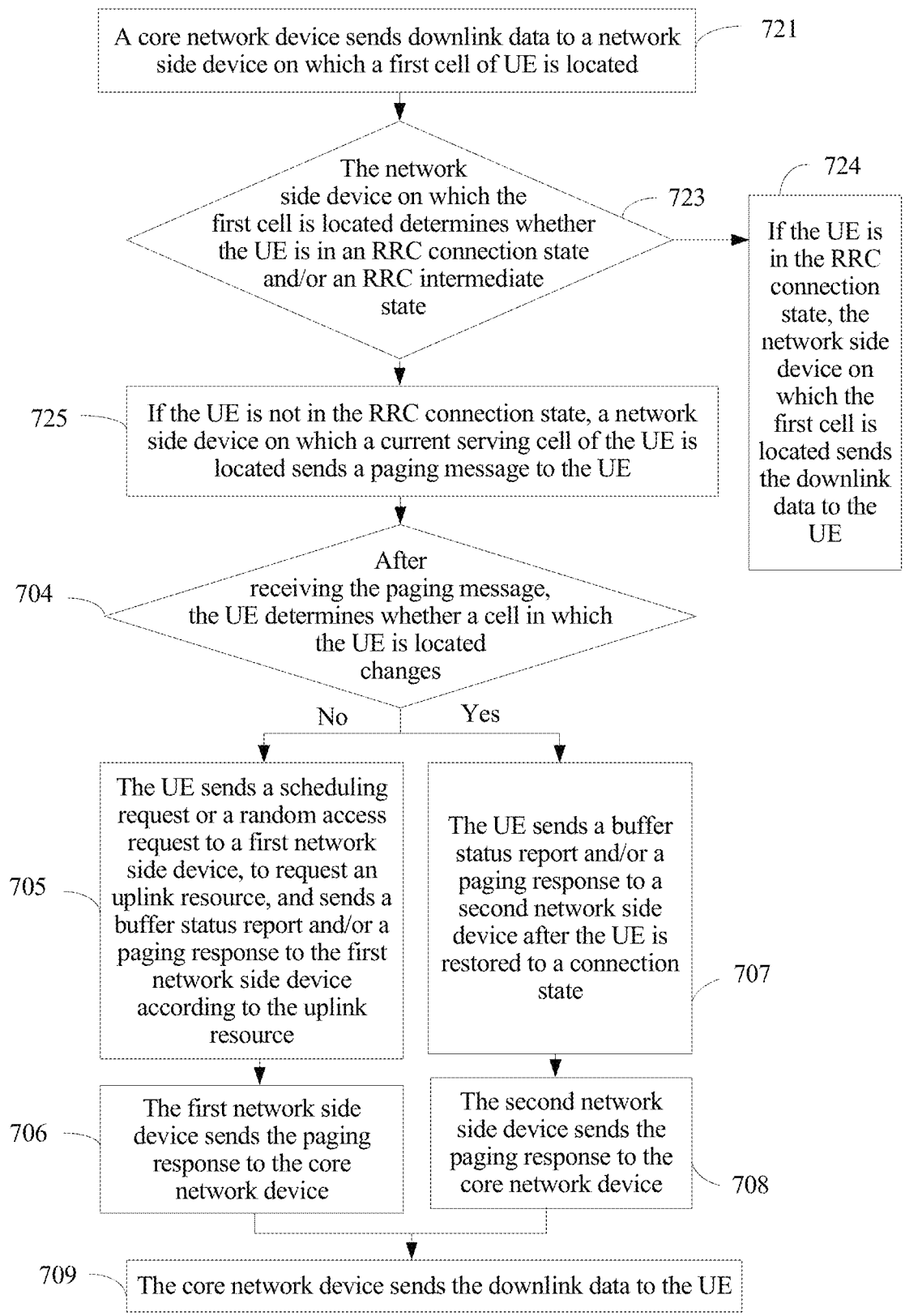
FIG. 7b is a schematic flowchart of a signaling optimization method according to an embodiment of the present disclosure.

As shown in FIG. 7b, another implementation is as follows: When a core network device needs to transmit downlink data to UE, the core network device only determines whether the UE is in a connection state or an idle state, and if the UE is in the connection state, the following steps are performed.

721. The core network device sends downlink data to a network side device on which a first cell of the UE is located.

When the core network device determines that the core network device does not store context information of the UE in an intermediate state, the UE may be in an idle state; or may be in the intermediate state but the network side device has not sent the context information of the UE in the intermediate state to the core network device; or may be in a connection state. If the UE is in the idle state and needs to transmit downlink data, a method the same as that in the prior art is performed. If the UE is in the intermediate state and needs to send downlink data, the core network device first sends the downlink data to the network side device on which the first cell of the UE is located. In this case, a network side device on which a current serving cell of the UE is located may be a first network side device before the cell of the UE changes, or may be a second network side device when the cell of the UE changes.

723. The network side device on which the first cell is located determines whether the UE is in an RRC connection state and/or an RRC intermediate state; then, go to step 724 or step 725.

724. If the UE is in the RRC connection state, the network side device on which the first cell is located sends the downlink data to the UE.

725. If the UE is not in the RRC connection state, a network side device on which a current serving cell of the UE is located sends a paging message to the UE.

The paging message may include context information of the UE. Then, steps 704 to 709 may be performed.

In the embodiments of the present disclosure, for example, when a cell in which the UE is located does not change, the second network side device is the same as the first network side device. When a cell in which the UE is located changes, the second network side device may be different from the first network side device.

It can be understood that when a network side device can simultaneously manage multiple cells, even if the cell of the UE changes, the UE may be on a same network side device. That is, in this case, a second network side device on which the UE is located is the same as the first network side device. This is not limited in the present disclosure.

By using the foregoing descriptions, a comparison of downlink data processing in a core network in the embodiments of the present disclosure and that in the prior art may be shown in table 1. Table 1 shows different method for processing downlink data by a network side device.

TABLE 1

| Case | Actual state of UE | Core network state | Downlink data processing in a core network | Processing performed by first network side device | Processing performed by second network side device |
|---|---|---|---|---|---|
| 1 | Connection state | Connection state | Page-in the prior art | Page-in the prior art | Page-in the prior art |
| 2 | Intermediate state | Connection state | Send the downlink data to the first network side device | Page the UE and send a paging message to the second network side device; and directly send the data to the UE according to a paging result, or send the data to the UE by using the second network side device | Page the UE; notify the first network side device after a connection is restored; and send the data to the UE |
| 3 | | | Send the downlink data to the first network side device | Page UE, and send a paging message to the second network side device; send the data to the second network side device; and send the data to the UE according to a paging result | Page UE; and send the data to the UE after a connection is restored |

TABLE 1-continued

| Case | Actual state of UE | Core network state | Downlink data processing in a core network | Processing performed by first network side device | Processing performed by second network side device |
|---|---|---|---|---|---|
| 4 | Intermediate state | Intermediate state | Page the UE inside a first network side device and a second network side device in a list; send, according to a paging result, data to a network side device to which the UE is restored to be connected | Page the UE, and feed back a paging response | Page the UE, and feed back a paging response |
| 5 |  |  | Directly send the data to a first network side device and a second network side device in a list | Page the UE, send the data to the UE, and feed back a paging response | Page the UE, send the data to the UE, and feed back a paging response |

This embodiment of the present disclosure provides a signaling optimization method. When UE establishes a connection to a network side device to be in a connection state, if configuration information sent by the network side device is received and the configuration information includes a cell list or a base station list, the UE switches from the connection state to an intermediate state when the UE stores context information of the UE. The intermediate state means that if the UE moves and a cell movement range falls within the list, the UE performs cell reselection without a need to notify the network side device. If the UE in the intermediate state needs to be restored to the connection state because there is data that needs to be transmitted or a TAU needs to be performed, the UE does not need to establish the context information of the UE with a network side. In comparison with a case in which the UE switches from an idle state to the connection state, signaling is reduced, a data transmission delay of the UE is shortened, and a problem of heavy signaling overheads and a long data transmission delay when the UE accesses the network side is resolved.

Figure 8:
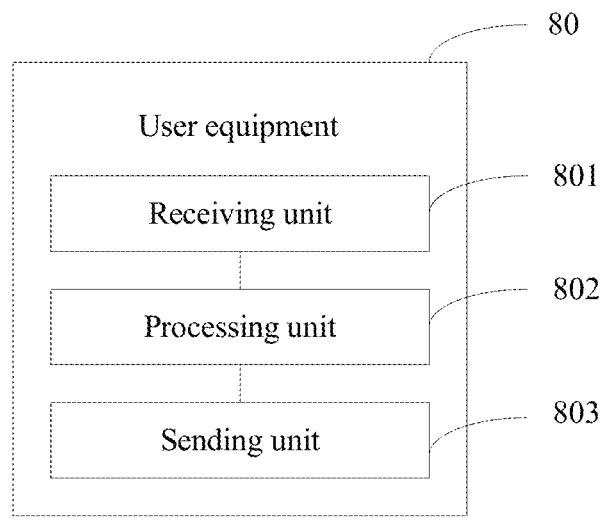
FIG. 8 is a schematic structural diagram of user equipment according to an embodiment of the present disclosure.

An embodiment of the present disclosure provides user equipment 80. As shown in FIG. 8, the user equipment 80 includes:

a receiving unit 801, configured to receive configuration information sent by a first network side device, where the configuration information includes a list, and the list is a cell list or a base station list; and a processing unit 802, configured to enter an intermediate state according to the configuration information, where the intermediate state means that: when the UE stores context information of the UE, if the UE moves and a cell movement range falls within a coverage area of a cell or a base station included in the list, the UE performs cell reselection according to the list.

Optionally, the intermediate state further means that: if the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

Optionally, the configuration information further includes a condition under which the first network side device instructs the UE to enter the intermediate state according to the configuration information, and the condition includes entering the intermediate state immediately or entering the idle state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

Optionally, the configuration information further includes a cell reselection parameter for performing cell reselection by the UE.

Optionally, the configuration information is carried in a radio resource control (RRC) message by the first network side device, and the RRC message includes an RRC connection establishment message, an RRC reconfiguration message, or an RRC connection release message.

Optionally, in a process in which the processing unit 802 is configured to perform cell reselection, when it is determined that the UE needs to send uplink data to a network side and/or needs to receive downlink data from the network side, the processing unit 802 is further configured to restore the UE 80 to the connection state.

The UE 80 further includes: a sending unit 803, configured to send the uplink data to a network side device that has been restored to the connection state; and/or the receiving unit is configured to receive the downlink data from the network side device that has been restored to the connection state. The network side device that has been restored to the connection state includes the first network side device or the second network side device.

Optionally, the processing unit 802 may be specifically configured to:

if the cell of the UE does not change, send a scheduling request or a random access request to the first network side device by using the sending unit 803, to restore the UE 80 to the connection state.

Optionally, the sending unit 803 may be further configured to send an RRC resume request message to the first network side device or the second network side device. The RRC resume confirmation message is used to instruct the UE to be restored to the connection state.

The receiving unit 801 may be further configured to receive an RRC resume confirmation message sent by the first network side device or the second network side device. The RRC resume confirmation message includes a parameter for extending, deleting, or modifying the context information of the UE by the first network side device or the second network side device.

The sending unit 803 may be further configured to send an RRC connection resume completion message to the first network side device or the second network side device.

This embodiment of the present disclosure provides user equipment. The user equipment is configured to: receive configuration information sent by a first network side device, where the configuration information includes a list, and the list is a cell list or a base station list; and enter an intermediate state according to the configuration information, where the intermediate state means that: when the UE stores context information of the UE, if the UE moves and a cell movement range falls within a coverage area of a cell or a base station included in the list, the UE performs cell reselection according to the list. In this way, a cell handover is not performed when a cell of the UE changes. Instead, cell reselection is performed when the UE stores the context information, so as to reduce signaling overheads of the UE and a network side, and shorten a data transmission delay.

Figure 9:
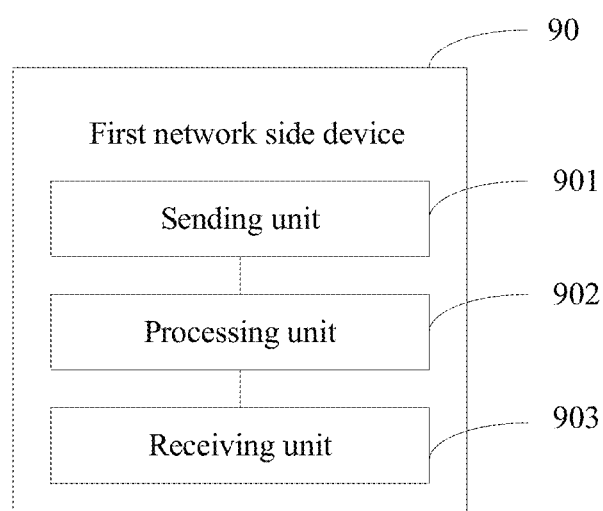
FIG. 9 is a schematic structural diagram of a first network side device according to an embodiment of the present disclosure.

An embodiment of the present disclosure provides a first network side device 90. As shown in FIG. 9, the first network side device 90 includes:

a sending unit 901, configured to send configuration information to a user equipment (UE), where the configuration information includes a list, the list is a cell list or a base station list, the configuration information is used to instruct the UE to enter an intermediate state, and the intermediate state means that when the UE stores context information of the UE, if the UE moves and a cell movement range falls within a coverage area of a cell or a base station included in the list, the UE performs cell reselection according to the list.

The sending unit 901 is further configured to send the context information of the UE to a network side device in the list.

Optionally, the configuration information is further used to indicate that after the UE enters the intermediate state, if the UE moves and the cell movement range falls beyond the coverage area of the cell or the base station included in the list, the UE sends a notification message to a network side device on which a current serving cell of the UE is located, so that the UE is restored from the intermediate state to a connection state or returns to an idle state, and the network side device on which the current serving cell is located is the first network side device or a second network side device after the UE performs cell reselection.

Optionally, the configuration information further includes a condition under which the first network side device instructs the UE to enter the intermediate state according to the configuration information, and the condition includes entering the intermediate state immediately or entering the intermediate state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

Optionally, the configuration information further includes a cell reselection parameter for performing cell reselection by the UE.

Optionally, the sending unit 901 may be specifically configured to:

send the configuration information to the UE by using a radio resource control (RRC) message, where the RRC message includes an RRC reconfiguration message or an RRC connection release message.

Optionally, the sending unit 901 may be further configured to send the context information of the UE to a core network device.

The first network side device 90 may further include: a processing unit 902, configured to release the context information of the UE when the first network side device 90 stores the context information of the UE for a preset time.

Optionally, the first network side device 90 may further include a receiving unit 903, configured to receive an RRC resume request message sent by the UE. The RRC resume request message includes at least one of cell information of the first network side device, a cell radio network temporary identity (C-RNTI) of the UE, or indication information for requesting to restore the UE to the connection state.

The sending unit 901 is further configured to send an RRC resume confirmation message to the UE. The RRC resume confirmation message includes a parameter for extending, deleting, or modifying the context information of the UE by the first network side device.

The receiving unit 903 may be further configured to receive an RRC connection resume completion message sent by the UE.

Optionally, the receiving unit 903 is further configured to receive an uplink scheduling request or a random access request sent by the UE.

The sending unit 901 is further configured to send an uplink resource to the UE. The uplink resource is used by the UE to send uplink data to the first network side device or to receive downlink data from the first network side device according to the uplink resource.

This embodiment of the present disclosure provides a first network side device. The first network side device is configured to: send configuration information to a user equipment (UE), where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list; and further send the context information of the UE to a network side device in the list. In this way, a cell handover is not performed when a cell of the UE in the intermediate state changes. Instead, a cell reselection process is performed, so as to reduce signaling overheads of the UE and a network side, and shorten a data transmission delay.

Figure 10:
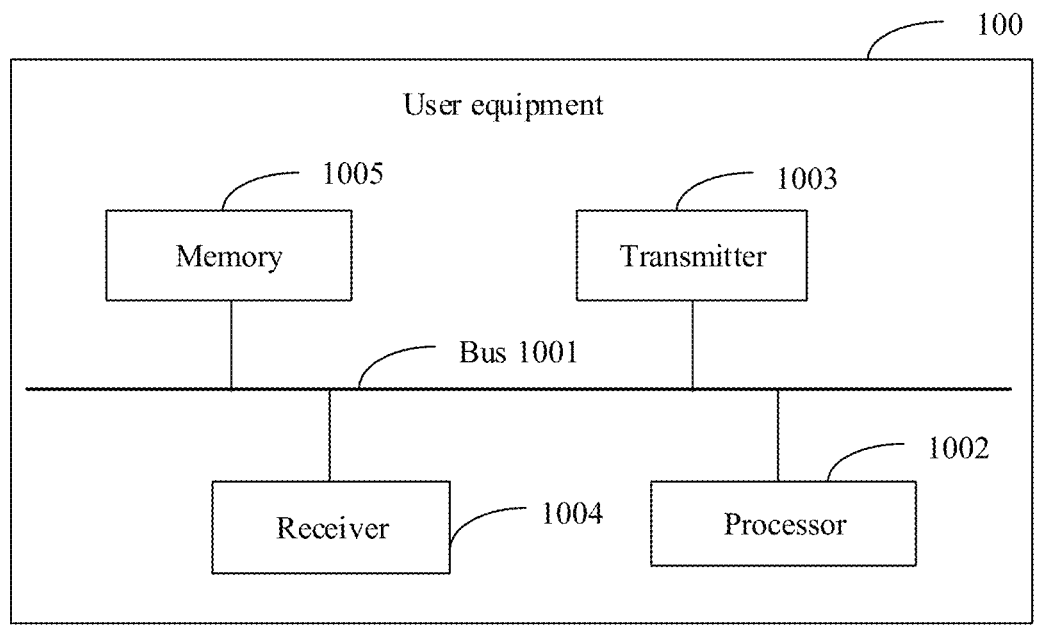
FIG. 10 is a schematic structural diagram of user equipment according to an embodiment of the present disclosure.

An embodiment of the present disclosure provides user equipment 100. As shown in FIG. 10, the user equipment 100 includes a bus 1001, and a transmitter 1003, a receiver 1004, a processor 1002, and a memory 1005 that are connected to the bus 1001. The memory 1005 is configured to store an instruction and data. The receiver 1004 executes the instruction, to receive configuration information sent by a first network side device. The configuration information includes a list. The list is a cell list or a base station list. The processor 1002 executes the instruction, to enter an intermediate state according to the configuration information. The intermediate state means that: when the UE stores context information of the UE, if the UE moves and a cell movement range falls within a coverage area of a cell or a base station included in the list, the UE performs cell reselection according to the list.

In this embodiment of the present disclosure, optionally, the intermediate state further means that: if the cell movement range of the UE falls beyond the coverage area of the cell or the base station included in the list, the UE sends a notification message to a network side device on which a current serving cell of the UE is located, so that the UE is restored from the intermediate state to a connection state or returns to an idle state. The network side device on which the current serving cell is located is the first network side device or a second network side device after the UE performs cell reselection.

In this embodiment of the present disclosure, optionally, the configuration information further includes a condition under which the first network side device instructs the UE to enter the intermediate state according to the configuration information, and the condition includes entering the intermediate state immediately or entering the idle state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

In this embodiment of the present disclosure, optionally, the configuration information further includes a cell reselection parameter for performing cell reselection by the UE.

In this embodiment of the present disclosure, optionally, the configuration information is carried in a radio resource control (RRC) message by the first network side device, and the RRC message includes an RRC connection establishment message, an RRC reconfiguration message, or an RRC connection release message.

In this embodiment of the present disclosure, optionally, in a process in which the processor 1002 executes the instruction to perform cell reselection, when it is determined that the UE 100 needs to send uplink data to a network side and/or needs to receive downlink data from the network side, the processor 1002 is further configured to restore the UE 100 to the connection state.

The transmitter 1003 executes the instruction to send the uplink data to a network side device that has been restored to the connection state; and/or the receiver 1004 is configured to receive the downlink data from the network side device that has been restored to the connection state. The network side device that has been restored to the connection state includes the first network side device or the second network side device.

In this embodiment of the present disclosure, optionally, the transmitter 1003 executes the instruction to:

if the cell of the UE does not change, send a scheduling request or a random access request to the first network side device, to restore the UE 100 to the connection state.

In this embodiment of the present disclosure, optionally, the transmitter 1003 executes the instruction to further send an RRC resume request message to the first network side device or the second network side device. The RRC resume request message includes at least one of cell information of the first network side device, a cell radio network temporary identity (C-RNTI) of the UE, or indication information for requesting to restore the UE to the connection state.

The receiver 1004 executes the instruction to further receive an RRC resume confirmation message sent by the first network side device or the second network side device. The RRC resume confirmation message is used to indicate that the UE is restored to the connection state.

The transmitter 1003 executes the instruction to further send an RRC connection resume completion message to the first network side device or the second network side device.

This embodiment of the present disclosure provides user equipment. The user equipment is configured to: receive configuration information sent by a first network side device, where the configuration information includes a list, and the list is a cell list or a base station list; and enter an intermediate state according to the configuration information, where the intermediate state means that: when the UE stores context information of the UE, if the UE moves and a cell movement range falls within a coverage area of a cell or a base station included in the list, the UE performs cell reselection according to the list. In this way, a cell handover is not performed when a cell of the UE changes. Instead, cell reselection is performed when the UE stores the context information, so as to reduce signaling overheads of the UE and a network side, and shorten a data transmission delay.

Figure 11:
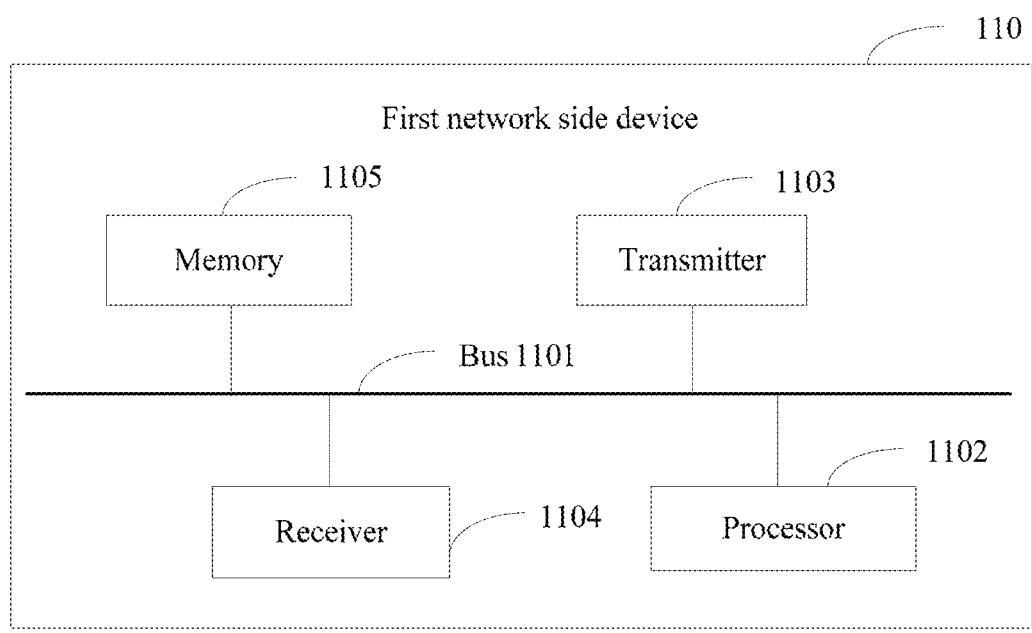
FIG. 11 is a schematic structural diagram of a first network side device according to an embodiment of the present disclosure.

An embodiment of the present disclosure provides a first network side device 110. As shown in FIG. 11, the first network side device 110 includes a bus 1101, and a transmitter 1103, a receiver 1104, a processor 1102, and a memory 1105 that are connected to the bus 1101. The memory 1105 is configured to store an instruction and data. The transmitter 1103 executes the instruction to send configuration information to a user equipment (UE). The configuration information includes a list. The list is a cell list or a base station list. The configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list. The transmitter 1103 executes the instruction to further send the context information of the UE to a network side device in the list.

In this embodiment of the present disclosure, optionally, the configuration information is further used to indicate that after the UE enters the intermediate state, if the UE moves and the cell movement range falls beyond the coverage area of the cell or the base station included in the list, the UE sends a notification message to a network side device on which a current serving cell of the UE is located, so that the UE is restored from the intermediate state to a connection state or returns to an idle state. The network side device on which the current serving cell is located is the first network side device or a second network side device after the UE performs cell reselection.

In this embodiment of the present disclosure, optionally, the configuration information further includes a condition under which the first network side device instructs the UE to enter the intermediate state according to the configuration information, and the condition includes entering the intermediate state immediately or entering the intermediate state after a preset time; and/or the configuration information further includes a time period in which the first network side device instructs the UE to enter the intermediate state according to the configuration information, and/or an operation instruction performed after the UE enters the intermediate state during the time period according to the configuration information, and the operation instruction is used to instruct the UE to enter the idle state and/or instruct the UE to notify the first network side device of current location information of the UE.

In this embodiment of the present disclosure, optionally, the configuration information further includes a cell reselection parameter for performing cell reselection by the UE.

In this embodiment of the present disclosure, optionally, the transmitter 1103 may execute the instruction to specifically:

send the configuration information to the UE by using a radio resource control (RRC) message, where the RRC message includes an RRC reconfiguration message or an RRC connection release message.

In this embodiment of the present disclosure, optionally, the transmitter 1103 may execute the instruction to further send the context information of the UE to a core network device.

The processor 1102 executes the instruction to release the context information of the UE when the first network side device 110 stores the context information of the UE for a preset time.

In this embodiment of the present disclosure, optionally, the receiver 1104 executes the instruction to receive an RRC resume request message sent by the UE. The RRC resume request message includes at least one of cell information of the first network side device, a cell radio network temporary identity (C-RNTI) of the UE, or indication information for requesting to restore the UE to the connection state.

The transmitter 1103 may execute the instruction to further send an RRC resume confirmation message to the UE. The RRC resume confirmation message includes a parameter for extending, deleting, or modifying the context information of the UE by the first network side device.

The receiver 1104 may execute the instruction to further receive an RRC connection resume completion message sent by the UE.

In this embodiment of the present disclosure, optionally, the receiver 1104 may execute the instruction to further receive an uplink scheduling request or a random access request sent by the UE.

The transmitter 1103 executes the instruction to further send an uplink resource to the UE. The uplink resource is used by the UE to send uplink data to the first network side device or to receive downlink data from the first network side device according to the uplink resource.

Therefore, this embodiment of the present disclosure provides a first network side device. The first network side device is configured to: send configuration information to a user equipment (UE), where the configuration information includes a list, the list is a cell list or a base station list, the configuration information is used to instruct the UE to enter an intermediate state, and the intermediate state means that: when the UE stores context information of the UE, if the UE moves and a cell movement range falls within a coverage area of a cell or a base station included in the list, the UE performs cell reselection according to the list; and further send the context information of the UE to a network side device in the list. In this way, a cell handover is not performed if a cell of the UE in the intermediate state changes. Instead, a cell reselection process is performed, so as to reduce signaling overheads of the UE and a network side, and shorten a data transmission delay.

Figure 12:
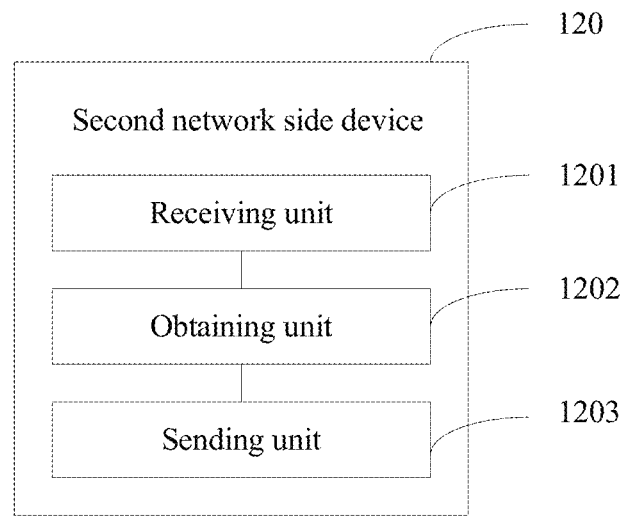
FIG. 12 is a schematic structural diagram of a second network side device according to an embodiment of the present disclosure.

An embodiment of the present disclosure provides a second network side device 120. As shown in FIG. 12, the second network side device 120 includes:

a receiving unit 1201, configured to receive indication information of a user equipment (UE) in an intermediate state that is sent by a first network side device, where the intermediate state means that: when the UE stores context information of the UE, if the UE moves and a cell movement range falls within a coverage area of a cell or a base station included in a list sent by the first network side device, the UE performs cell reselection according to the list; and an obtaining unit 1202, configured to obtain the context information of the UE from the first network side device, or obtain the context information of the UE from the second network side device when a radio resource control (RRC) resume request message sent by the UE is received, so as to receive uplink data from the UE or send downlink data to the UE.

The second network side device may be a network side device that is obtained after the UE performs cell reselection and on which a cell is located.

Optionally, the receiving unit 1201 may be configured to receive and save context information of the UE that is sent by the first network side device.

Optionally, the obtaining unit 1202 may be specifically configured to:

if the second network side device does locally store the context information of the UE before the second network side device receives the RRC resume request message sent by the UE, obtain the context information of the UE from the second network side device; or if the second network side device does not locally store the context information of the UE before the second network side device receives the RRC resume request message sent by the UE, obtain the context information of the UE from the first network side device.

The RRC resume request message is used to be sent to the second network side device when the UE is restored from the intermediate state to a connection state.

Optionally, the second network side device 120 further includes: a sending unit 1203, configured to: when the second network side device receives a paging message sent by a core network device and determines that there is the downlink data that needs to be sent to the UE, send the paging message to the UE, and after the second network side device establishes an RRC connection to the UE, send, to the UE, the downlink data received from the core network device.

Alternatively, the sending unit 1203 is further configured to: when a paging message sent by the first network side device is received and it is determined that there is the downlink data that needs to be sent to the UE, send the paging message to the UE, and after the second network side device establishes an RRC connection to the UE, send, to the UE, the downlink data received from the first network side device.

This embodiment of the present disclosure provides a second network side device. The second network side device receives indication information of UE in an intermediate state that is sent by a first network side device. Therefore, when a network side device on which a current serving cell of the UE is located is the second network side device, the second network side device may not execute a process of establishing context information of the UE with the UE. Instead, The second network side device directly obtains the context information of the UE from the second network side device or from the first network side device, so as to reduce signaling overheads of the UE and a network side, and shorten a data transmission delay.

Figure 13:
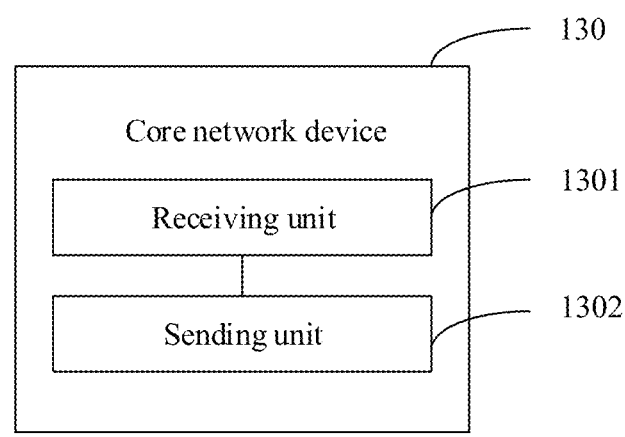
FIG. 13 is a schematic structural diagram of a core network device according to an embodiment of the present disclosure.

An embodiment of the present disclosure further provides a core network device 130. As shown in FIG. 13, the core network device 130 includes:

a receiving unit 1301, configured to receive indication information of a user equipment (UE) in an intermediate state that is sent by the UE, where the intermediate state means that: when the UE stores context information of the UE, if the UE moves and a cell movement range falls within a coverage area of a cell or a base station included in a list sent by a first network side device to the UE, the UE performs cell reselection according to the list; and a sending unit 1302, configured to: if the core network device needs to transmit downlink data to the UE, send a paging message to at least one network side device in the list, to send the downlink data to the UE by using a first network side device or a second network side device that is in the at least one network side device and that is connected to the UE; or send the downlink data to the first network side device, to send the downlink data to the UE by using the first network side device; or send the downlink data to at least one network side device in the list, to send the downlink data to the UE by using the at least one network side device.

Optionally, the receiving unit 1301 is further configured to receive and save context information of the UE that is sent by the first network side device.

This embodiment of the present disclosure provides a core network device. The core network device receives indication information of a user equipment (UE) in an intermediate state that is sent by the UE. In this way, when transmitting downlink data to the UE, the core network device may send a paging message to a network side device in a list, to send the downlink data to the UE by using a network side device that receives the paging message and that has an RRC connection to the UE; or directly send the downlink data to a first network side device, and send the downlink data to the UE by using the first network side device, so as to reduce signaling overheads of the UE and a network side, and shorten a data transmission delay.

Figure 14:
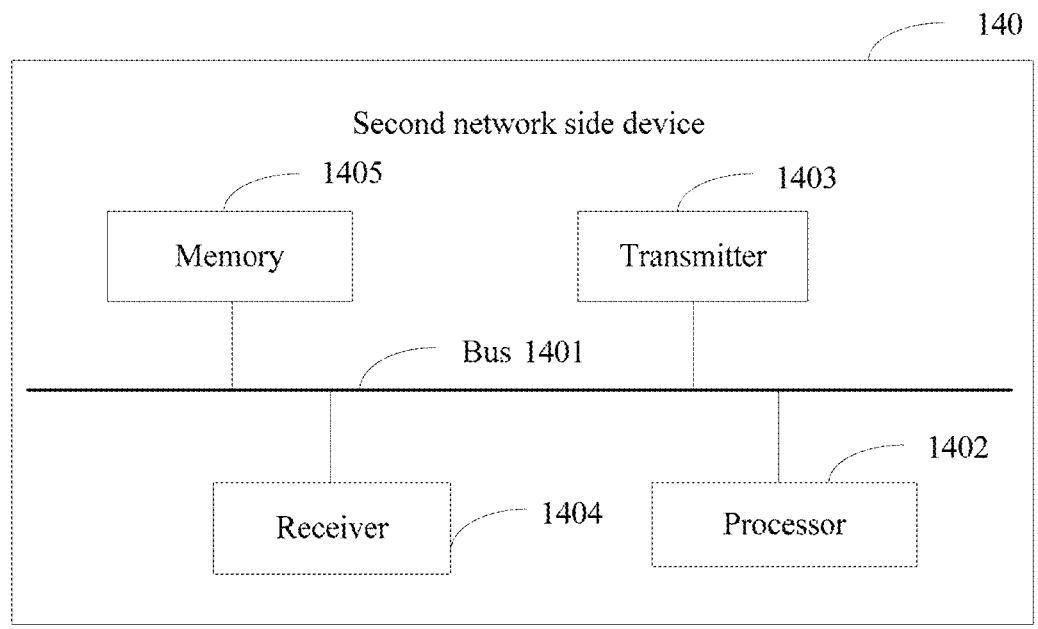
FIG. 14 is a schematic structural diagram of a second network side device according to an embodiment of the present disclosure.

An embodiment of the present disclosure provides a second network side device 140. As shown in FIG. 14, the second network side device 140 includes a bus 1401, and a transmitter 1403, a receiver 1404, a processor 1402, and a memory 1405 that are connected to the bus 1401. The memory 1405 is configured to store an instruction and data. The receiver 1404 executes the instruction to receive indication information of a user equipment (UE) in an intermediate state that is sent by a first network side device. The intermediate state means that: when the UE stores context information of the UE, if the UE moves and a cell movement range falls within a coverage area of a cell or a base station included in a list sent by the first network side device, the UE performs cell reselection according to the list. The processor 1402 is configured to obtain the context information of the UE from the first network side device, or obtain the context information of the UE from the second network side device when the receiver receives a radio resource control (RRC) resume request message sent by the UE, so as to receive uplink data from the UE or send downlink data to the UE.

In this embodiment of the present disclosure, optionally, the receiver 1404 is further configured to receive and save context information of the UE that is sent by the first network side device.

In this embodiment of the present disclosure, optionally, the processor 1402 is specifically configured to: if the memory 1405 stores the context information of the UE when the receiver 1404 receives the radio resource control (RRC) resume request message sent by the UE, obtain the context information of the UE from the memory 1405; or if the memory 1405 does not store the context information of the UE before the receiver 1404 receives the RRC resume request message sent by the UE, obtain the context information of the UE from the first network side device.

The RRC resume request message is used to be sent to the second network side device when the UE is restored from the intermediate state to a connection state.

In this embodiment of the present disclosure, optionally, the transmitter 1403 is configured to: when the second network side device receives a paging message sent by a core network device and determines that there is the downlink data that needs to be sent to the UE, send the paging message to the UE, and after the second network side device establishes an RRC connection to the UE, send, to the UE, the downlink data received from the core network device; or the transmitter 1403 is configured to: when a paging message sent by the first network side device is received and it is determined that there is the downlink data that needs to be sent to the UE, send the paging message to the UE, and after the second network side device establishes an RRC connection to the UE, send, to the UE, the downlink data received from the first network side device.

This embodiment of the present disclosure provides a second network side device. The second network side device receives indication information of UE in an intermediate state that is sent by a first network side device. Therefore, when a network side device on which a current serving cell of the UE is located is the second network side device, the second network side device may not execute a process of establishing context information of the UE with the UE. Instead, the second network side device directly obtains the context information of the UE from the second network side device or from the first network side device, so as to reduce signaling overheads of the UE and a network side, and shorten a data transmission delay.

Figure 15:
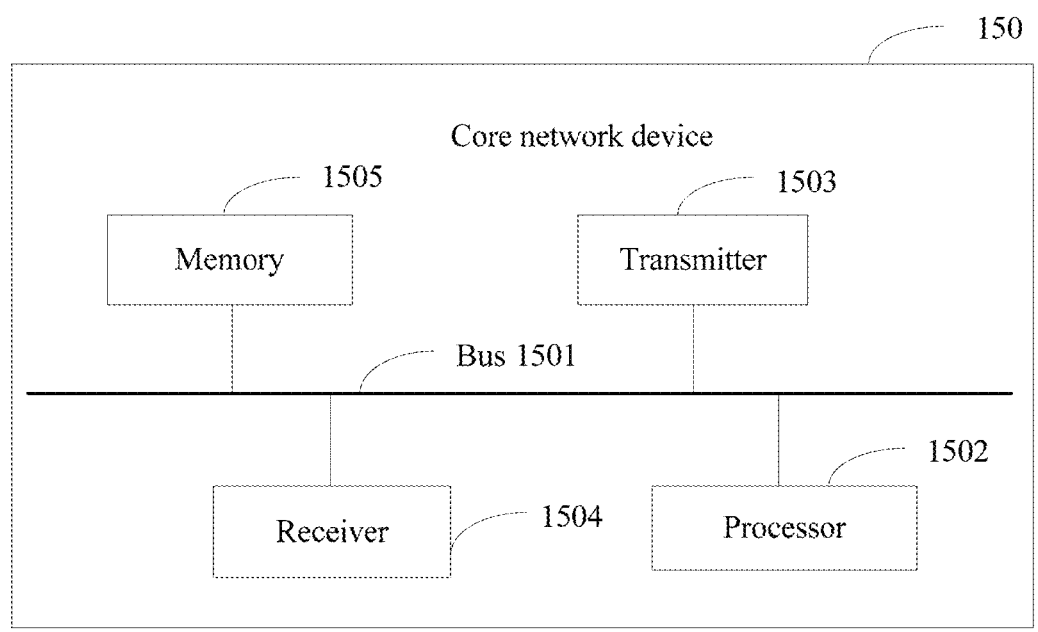
FIG. 15 is a schematic structural diagram of a core network device according to an embodiment of the present disclosure.

An embodiment of the present disclosure provides a core network device 150. As shown in FIG. 15, the core network device 150 includes a bus 1501, and a transmitter 1503, a receiver 1504, a processor 1502, and a memory 1505 that are connected to the bus 1501. The memory 1505 is configured to store an instruction and data. The receiver 1504 is configured to receive indication information of a user equipment (UE) in an intermediate state that is sent by the UE. The intermediate state means that: when the UE stores context information of the UE, if the UE moves and a cell movement range falls within a coverage area of a cell or a base station included in a list sent by a first network side device to the UE, the UE performs cell reselection according to the list.

The transmitter 1503 is configured to: if the core network device needs to transmit downlink data to the UE, send a paging message to at least one network side device in the list, to send the downlink data to the UE by using a first network side device or a second network side device that is in the at least one network side device and that is connected to the UE; or send the downlink data to the first network side device, to send the downlink data to the UE by using the first network side device; or send the downlink data to at least one network side device in the list, to send the downlink data to the UE by using the at least one network side device.

Optionally, the receiver 1504 is further configured to receive and save context information of the UE that is sent by the first network side device.

This embodiment of the present disclosure provides a core network device. The core network device receives indication information of a user equipment (UE) in an intermediate state that is sent by the UE. In this way, when transmitting downlink data to the UE, the core network device may send a paging message to a network side device in a list, to send the downlink data to the UE by using a network side device that receives the paging message and that has an RRC connection to the UE; or directly send the downlink data to a first network side device, and send the downlink data to the UE by using the first network side device, so as to reduce signaling overheads of the UE and a network side, and shorten a data transmission delay.

In the several embodiments provided in this application, it should be understood that the disclosed device and method may be implemented in other manners. For example, the described device embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

In addition, functional units in the devices and systems in the embodiments of the present disclosure may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A wireless apparatus, comprising:
   a non-transitory memory storing executable instructions; and
   a processor configured to execute the executable instructions to perform operations comprising:
   in a connected state during which the wireless apparatus is connected to a first cell, storing context information regarding a connection with the first cell, wherein the context information includes an identifier of the wireless apparatus;
   receiving configuration information for configuring an intermediate state from the first cell and entering the intermediate state according to the configuration information, wherein the configuration information includes a list of cells for the wireless apparatus to select from, wherein the intermediate state is different from an idle state or the connected state, and wherein during the intermediate state, the wireless apparatus keeps the context information regarding the connection with the first cell;
   moving to a second cell;
   determining whether the second cell is one of the cells in the list of cells;
   in response to determining that the second cell is one of the cells in the list of cells, reselecting to the second cell without notifying a base station of the second cell being reselected; and
   in response to determining that the second cell is not one of the cells in the list of cells, sending a notification message to the base station of the second cell, and switching the wireless apparatus from the intermediate state to the idle state or the connected state.

2. The wireless apparatus according to claim 1, wherein the configuration information is carried in a radio resource control (RRC) message, and the RRC message comprises an RRC connection release message.

3. The wireless apparatus according to claim 1, wherein the identifier of a wireless apparatus includes a cell radio network temporary identity (C-RNTI).

4. The wireless apparatus according to claim 1, wherein the context information regarding the connection with the first cell comprises:
   radio bearer configuration information of the wireless apparatus; or
   a Media Access Control (MAC) layer configuration parameter of the wireless apparatus; or
   a physical layer parameter configuration of the wireless apparatus; or
   a security-related parameter of the wireless apparatus.

5. A method applied in a user equipment (UE), the method comprising:
   in a connected state during which the UE is connected to a first cell, storing context information regarding a connection with the first cell, wherein the context information includes an identifier of the UE;
   receiving configuration information for configuring an intermediate state from the first cell and entering the intermediate state according to the configuration information, wherein the configuration information includes a list of cells for the UE to select from, wherein the intermediate state is different from an idle state or the connected state, and wherein during the intermediate state, the UE keeps the context information regarding the connection with the first cell;
   moving to a second cell;
   determining whether the second cell is one of the cells in the list of cells;
   in response to determining that the second cell is one of the cells in the list of cells, reselecting to the second cell without notifying a base station of the second cell being reselected; and
   in response to determining that the second cell is not one of the cells in the list of cells, sending a notification message to the base station of the second cell, and switching from the intermediate state to the idle state or the connected state.

6. The method according to claim 5, further comprising:
establishing a radio resource control (RRC) connection to the first cell; and
entering an RRC connection state, before the receiving the configuration information from the first cell.

7. The method according to claim 5, wherein the configuration information is carried in a radio resource control (RRC) message and the RRC message comprises an RRC connection release message.

8. The method according to claim 5, wherein the identifier of a UE includes a cell radio network temporary identity (C-RNTI).

9. The method according to claim 5, wherein the context information regarding the connection with the first cell comprises:
radio bearer configuration information of the UE; or
a Media Access Control (MAC) layer configuration parameter of the UE; or
a physical layer parameter configuration of the UE; or
a security-related parameter of the UE.

10. The method according to claim 9, wherein the configuration information instructs the UE to enter the intermediate state.

11. The method according to claim 5, further comprising:
restoring to the connected state; and
sending uplink data to the first cell after the UE has been restored to the connected state.

12. The method according to claim 5, further comprising:
restoring to the connected state; and
receiving downlink data from the first cell after the UE has been restored to the connected state.

13. The method according to claim 5, wherein the configuration information includes a time period in which the first cell instructs the UE to enter the intermediate state according to the configuration information.

14. The method according to claim 5, wherein the configuration information includes a time period in which the first cell instructs the UE to perform an operation instruction after the UE enters the intermediate state during the time period according to the configuration information.

15. The method according to claim 5, wherein the reselecting to the second cell from the cells in the list of cells is based on a cell reselection criterion.

16. The method according to claim 5, wherein the reselecting to the second cell from the cells in the list of cells is based on a cell reselection parameter, obtained by a system broadcast message of a serving cell in which the UE is located.

17. The method according to claim 16, wherein the cell reselection parameter is carried in the configuration information sent by the first cell.

18. The method according to claim 5, wherein the configuration information further includes information that instructs the UE to enter the intermediate state.

19. A non-transitory computer readable storage medium, wherein the non-transitory computer readable storage medium stores a program that, when executed by a processor, causes the following steps to be performed:
in a connected state during which a user equipment (UE) is connected to a first cell, storing context information regarding a connection with the first cell, wherein the context information includes an identifier of the UE;
receiving from the first cell, configuration information for configuring an intermediate state and entering the intermediate state according to the configuration information, wherein the configuration information includes a list of cells for the UE to select from, wherein the intermediate state is different from an idle state or the connected state, and wherein during the intermediate state, the UE keeps the context information regarding the connection with the first cell;
moving to a second cell;
determining whether the second cell is one of the cells in the list of cells;
in response of determining that the second cell is one of the cells in the list of cells, reselecting to the second cell without notifying a base station of the second cell; and
in response to determining that the second cell is not one of the cells in the list of cells, sending a notification message to the base station of the second cell, and switching from the intermediate state to the idle state or the connected state.

20. The non-transitory computer readable storage medium according to claim 19, wherein the configuration information instructs the UE to enter the intermediate state.

* * * * *